(12) United States Patent
Randle

(10) Patent No.: US 10,988,067 B1
(45) Date of Patent: Apr. 27, 2021

(54) DUMP TRAILER AND SYSTEM FOR A SEMI-TRAILER TRUCK

(71) Applicant: Veradyn LLC, Littleton, CO (US)

(72) Inventor: Dustin R. Randle, Littleton, CO (US)

(73) Assignee: Veradyn LLC, Littleton, CO (US)

( * ) Notice: Subject to any disclaimer, the term of this patent is extended or adjusted under 35 U.S.C. 154(b) by 0 days.

(21) Appl. No.: 17/080,511

(22) Filed: Oct. 26, 2020

(51) Int. Cl.
*B60P 1/16* (2006.01)
*B60P 1/28* (2006.01)

(52) U.S. Cl.
CPC ............. *B60P 1/162* (2013.01); *B60P 1/283* (2013.01)

(58) Field of Classification Search
CPC .. B60P 1/162; B60P 1/283; B60P 1/16; B60P 1/045; B60P 1/34; B60P 1/006; B60P 1/04; B60P 1/28; B60P 1/165
USPC ........... 298/22 C, 22 R, 17 S, 22 P, 19 R, 11, 298/17.5, 18, 29, 7, 35 R, 24; 414/408, 414/501, 555, 546, 11, 477, 498, 539, 414/541, 685, 697
See application file for complete search history.

(56) References Cited

U.S. PATENT DOCUMENTS

| | | | |
|---|---|---|---|
| 3,044,832 A | 7/1962 | Mcmanus | |
| 3,203,735 A | 8/1965 | August | |
| 3,331,616 A | 7/1967 | Jackson | |
| 3,464,755 A | 9/1969 | Brown | |
| 3,640,578 A | 2/1972 | Finney | |
| 4,036,528 A | 7/1977 | Langendorf | |
| 4,129,310 A | 12/1978 | Nordmark | |
| 4,145,682 A | 3/1979 | Cook | |
| 4,216,996 A | 8/1980 | Pitts | |
| 4,261,616 A | 4/1981 | Beegle | |
| 4,658,508 A | 4/1987 | Oberg | |
| 4,682,145 A | 7/1987 | Brawner, Jr. | |
| 4,988,974 A | 1/1991 | Fury et al. | |
| 5,742,228 A | 4/1998 | Levy | |
| 5,769,502 A | 6/1998 | Bettini | |
| 5,971,493 A | 10/1999 | Robert | |
| 6,027,173 A | 2/2000 | Bettini | |
| 6,505,891 B1 * | 1/2003 | Hickey | B60P 1/16 298/20 A |
| 6,641,161 B1 | 11/2003 | McLelland | |
| 8,025,340 B2 | 9/2011 | Foisie | |
| 8,267,480 B2 | 9/2012 | Kvist et al. | |
| 8,303,044 B2 * | 11/2012 | Obermeyer | B60P 1/28 298/22 R |
| 8,317,215 B2 * | 11/2012 | Quenzi | B60P 3/122 280/425.1 |
| 8,327,966 B2 * | 12/2012 | Timoney | B60G 3/20 180/235 |
| 8,408,657 B2 | 4/2013 | Foisie | |
| 8,670,906 B2 * | 3/2014 | Ichinose | B60P 1/283 701/49 |
| 9,120,416 B2 | 9/2015 | Minoshima et al. | |
| 9,937,844 B2 | 4/2018 | Cronholm | |

(Continued)

*Primary Examiner* — D Glenn Dayoan
*Assistant Examiner* — Sunsurraye Westbrook
(74) *Attorney, Agent, or Firm* — Stephen Basil Katsaros

(57) ABSTRACT

A dump trailer and system for a semi-trailer truck are disclosed. The dump trailer and system includes a tub, a coupling plate configured to engage the dump trailer to the tractor, a first hydraulic cylinder hinge, a second hydraulic cylinder, and a draft arm attached to the coupling plate and the tub that cooperate to improve manufacturing economics and/or dumping of a load carried by the dump trailer.

19 Claims, 16 Drawing Sheets

(56) References Cited

U.S. PATENT DOCUMENTS

| | | |
|---|---|---|
| 10,076,989 B2 | 9/2018 | Baldys et al. |
| 10,406,960 B2 | 9/2019 | Baldys et al. |
| 2008/0208416 A1 | 8/2008 | Yuet et al. |
| 2010/0084908 A1 | 4/2010 | Montocchio |
| 2011/0283693 A1 | 11/2011 | Ramler et al. |
| 2015/0127212 A1 | 5/2015 | Chacon et al. |

* cited by examiner

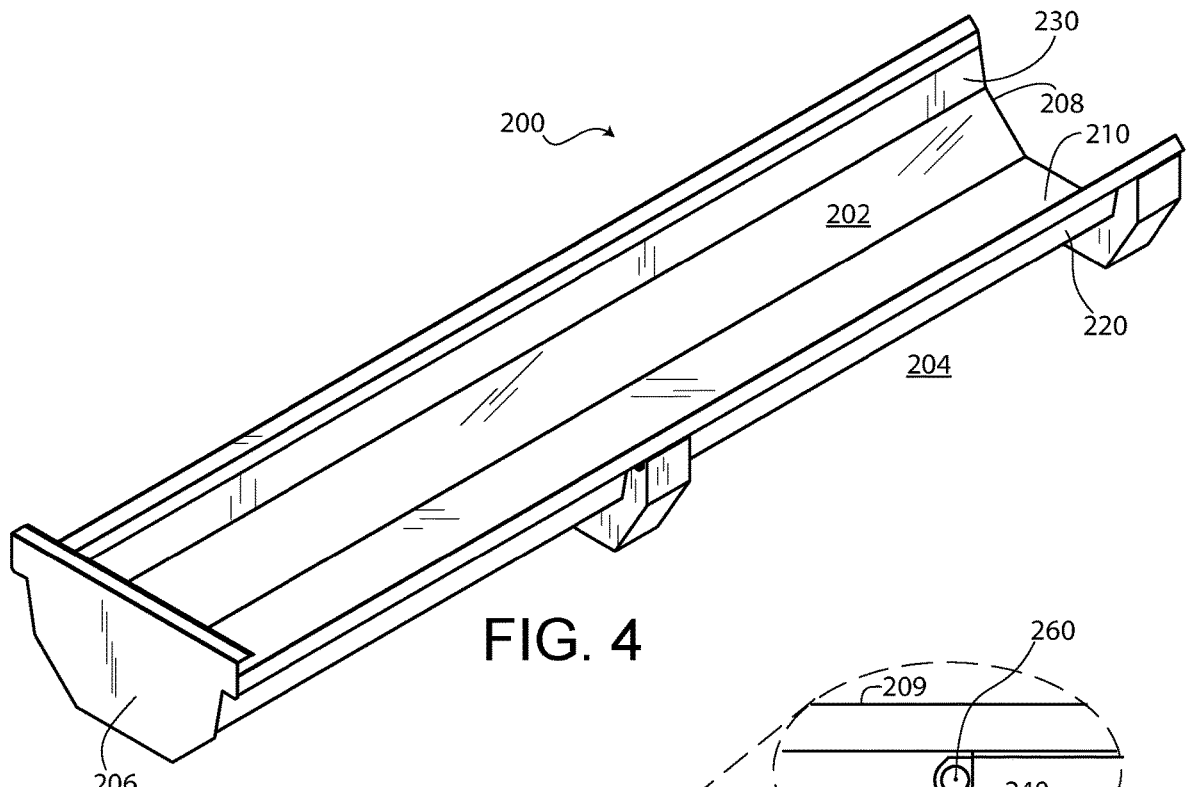
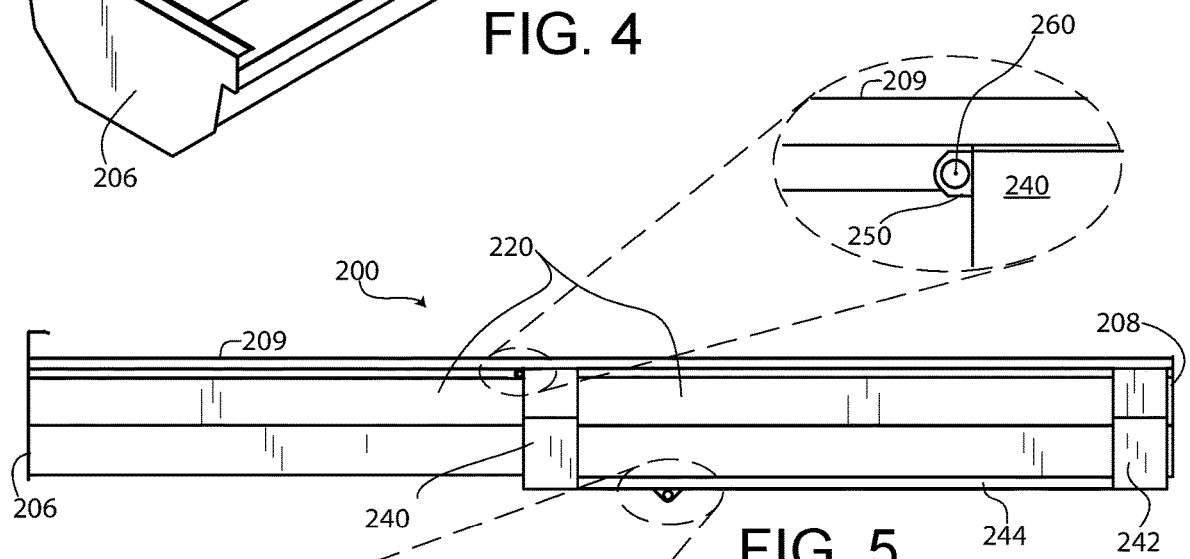
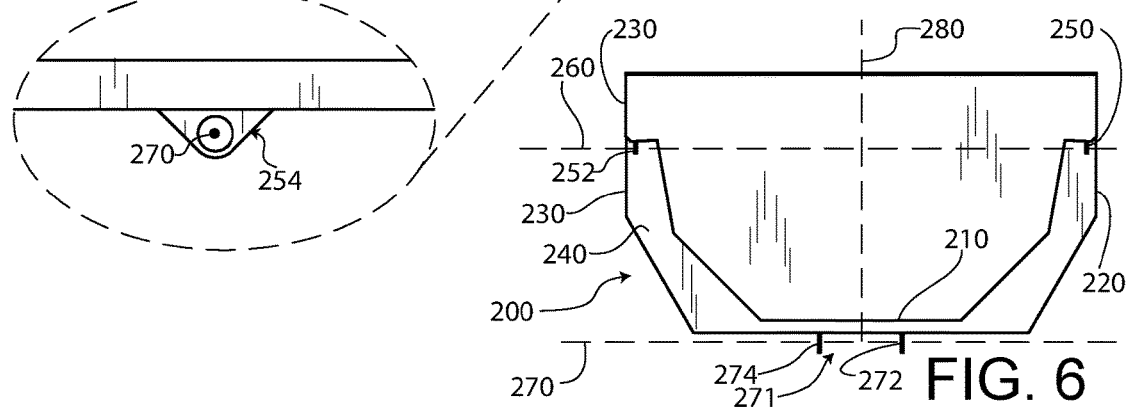
FIG. 4
FIG. 5
FIG. 6

DUMP TRAILER AND SYSTEM FOR A SEMI-TRAILER TRUCK

TECHNICAL FIELD

This disclosure pertains generally, but not by way of limitation, to a dump trailer and system for a semi-trailer truck. In particular, the dump trailer and system for a semi-trailer truck described herein provide basic operational benefits to the field of moving cargo from one location to another location with a semi-trailer truck.

BACKGROUND

A semi-trailer truck is the combination of a tractor unit and a semi-trailer to carry freight. The tractor unit is coupled to the trailer with a hitch called a fifth-wheel; and the semi-trailer is configured for the freight being carried. A semi-trailer may, for example, be configured as a dump trailer having a closed end capable of being raised to allow cargo (e.g. road materials or agricultural produce) to slide out an open end that is opposite of the raised closed end. Other configurations include: a box with access doors on the back and/or sides; a car carrier for transporting vehicles; a flatbed trailer for carrying large pieces of equipment; a drop-deck trailer; a double decker configured to carry pallets of cargo; a dry bulk trailer for carrying dry powder materials such as cement, sand, and flour; a livestock trailer for hauling livestock; and, a tanker trailer are used for hauling liquids such as gasoline.

In the case of a semi-trailer truck configured with a dump trailer, typically the dump trailer is loaded with cargo at one location and then transported to a different location. At this different location, the closed end is raised to allow the cargo to be ejected from the dump trailer.

SUMMARY

In one example, a dump trailer for a semi-trailer truck may include: a tub, defining an exterior portion that may include: a web; a left wall adjoining the web; a right wall adjoining the web and symmetrical to the left wall; a closed end adjoining the web, the left wall, and the right wall; an open end oppositely disposed from the closed end and adjoining the web, the left wall, and the right wall; a hinge axis parallel to and offset from the web; a left hinge formed on the exterior portion of the left wall and coaxial with the hinge axis; a right hinge formed on the exterior portion of the right wall and coaxial with the hinge axis; a distal draft arm axis parallel and adjacent to the web, the distal draft arm axis formed on the exterior portion of the web; and a center hinge formed on the web and coaxial with the distal draft arm axis, the center hinge symmetrically disposed between the left wall and the right wall; a coupling plate to engage the dump trailer to the semi-trailer truck, may include: a hydraulic cylinder axis formed on the coupling plate; a left hydraulic cylinder hinge formed on the coupling plate and coaxial with the hydraulic cylinder axis; a right hydraulic cylinder hinge formed on the coupling plate and coaxial with the hydraulic cylinder axis; a proximal draft arm axis formed on the coupling plate; and a draft arm hinge formed on the coupling plate and coaxial with the draft arm axis, the draft arm hinge symmetrically disposed between the left hydraulic cylinder hinge and the left hydraulic cylinder hinge; a draft arm symmetrically disposed between the left wall and the right wall of the tub, the draft arm may include: a proximal end attached to the draft arm hinge of the coupling plate and rotationally attached to the coupling plate about the proximal draft arm axis; and a distal end oppositely disposed from the proximal end, attached to the center hinge of the tub, and rotationally attached to the tub about the distal draft arm axis; a left hydraulic cylinder defining a left cylinder length, the left hydraulic cylinder may include: a proximal end attached to the left hydraulic cylinder hinge; a distal end oppositely disposed from the proximal end and attached to the left hinge on the tub; and wherein addition of a first amount of fluid changes the left cylinder length; a right hydraulic cylinder defining a right cylinder length, the right hydraulic cylinder may include: a proximal end attached to the right hydraulic cylinder hinge; a distal end oppositely disposed from the proximal end and attached to the right hinge on the tub; and wherein addition of a second amount of fluid changes the right cylinder length; a rear assembly pivotally attached to the tub at the web adjacent to the open end, the rear assembly may include: a first pair of wheels; and a rear pivot around which the tub rotates; whereby increase in both left cylinder length and right cylinder length cause: the distal end of the draft arm to move away from earth; and the tub to rotate about the rear pivot.

In another example, a method of controlling unloading of a dump trailer may include: providing a tub, defining an exterior portion that may include: a web; a left wall adjoining the web; a right wall adjoining the web and symmetrical to the left wall; a closed end adjoining the web, the left wall, and the right wall; an open end: oppositely disposed from the closed end; and, adjoining the web, left wall, and right wall; a hinge axis formed through the left wall and the right wall; a left hinge formed on the exterior portion of the left wall and coaxial with the hinge axis; a right hinge formed on the exterior portion of the right wall and coaxial with the hinge axis; a distal draft arm axis adjacent to the web and on the exterior portion of the web; a center hinge formed on the web and coaxial with the distal draft arm axis; and a center plane symmetrically disposed between the left wall and the right wall; providing a coupling plate, configured to engage the dump trailer to semi-trailer truck, may include: a hydraulic cylinder axis formed on the coupling plate; a left hydraulic cylinder hinge: formed on the coupling plate; and coaxial with the hydraulic cylinder axis; a right hydraulic cylinder hinge: formed on the coupling plate; and coaxial with the hydraulic cylinder axis; a proximal draft arm axis formed on the coupling plate; and a draft arm hinge: formed on the coupling plate; and coaxial with the draft arm axis; providing a draft arm, symmetrically disposed between the left wall and the right wall of the tub, may include: a proximal end rotationally attached to the coupling plate about the proximal draft arm axis; and a distal end: oppositely disposed from the proximal end; attached to the center hinge; and whereby the draft arm is rotationally attached to the tub about the distal draft arm axis; providing a left hydraulic cylinder, defining a left cylinder length, may include: a proximal end attached to the left hydraulic cylinder hinge; a distal end oppositely disposed from the proximal end and attached to the left hinge on the tub; and wherein addition of a first amount of fluid changes the left cylinder length; providing a right hydraulic cylinder, defining a right cylinder length, may include: a proximal end attached to the right hydraulic cylinder hinge; a distal end oppositely disposed from the proximal end and attached to the right hinge on the tub; and wherein addition of a second amount of fluid changes the right cylinder length; providing a rear assembly attached to the tub adjoining the web and adjacent to the open end, the rear assembly may include: a first pair of wheels; and a rear pivot about which the tub rotates; a second pair of wheels parallel to the first pair of wheels; a spring assembly may include: at least one leaf spring may include first end and a second end; a first axle attachment on the first end; a second axle attachment on the second end; and a hinge symmetrically attached between the first end and the second end of the leaf spring; wherein the first pair of wheels are attached to the first axle attachment with a first axle; wherein the second pair of wheel are attached to the second axle attachment with a second axle; and wherein the rear pivot about which the tub rotates is coaxial with the hinge of the rear assembly; increasing in both the left cylinder length and the right cylinder length: moves the distal end of the draft arm to away from earth; and rotates the tub about the rear pivot; monitoring perpendicularity of the center plane; increasing either the left cylinder length or the right cylinder length to compress the leaf spring in the spring assembly; and thereby controlling the unloading of the dump trailer.

In another example, a dump trailer for a semi-trailer truck may include: a chassis plane formed on the semi-trailer truck, wherein the chassis plane is defined by at least two axles of the semi-trailer truck that are coplanar to the chassis plane; a tub, may include: a web; a left side adjoining the web; a right side adjoining the web; and a center plane formed on the tub, wherein the center plane is symmetrically located between the left wall and the right wall; a draft arm symmetrically disposed between the left side and the right side of the tub, the draft arm may include: a proximal end; and a distal end oppositely disposed from the proximal end, rotationally attached to the web of the tub; a coupling plate to engage the dump trailer to the semi-trailer truck, wherein: the proximal end of the draft arm is rotationally attached to the coupling plate; a left hydraulic cylinder defining a left cylinder length, the left hydraulic cylinder may include: a proximal end rotationally attached to the coupling plate; and a distal end oppositely disposed from the proximal end and rotationally attached to the tub; a right hydraulic cylinder defining a right cylinder length, the right hydraulic cylinder may include: a proximal end rotationally attached to the coupling plate; and a distal end oppositely disposed from the proximal end and rotationally attached to the tub; a rear assembly pivotally attached to the tub at the web, the rear assembly may include: a first pair of wheels; and a rear pivot around which the tub rotates; a perpendicular condition wherein: the center plane of the tub is perpendicular to the chassis plane; and the left cylinder length and the right cylinder length are equal; a canted condition wherein: the center plane is non-perpendicular to the chassis plane; and the right cylinder length and the right cylinder length are different.

BRIEF DESCRIPTION OF THE DRAWING

The accompanying figures of the drawing, which are included to provide a further understanding of general aspects of the dump trailer and system for a semi-trailer truck, are incorporated in and constitute a part of this specification. These illustrative aspects of the dump trailer and system for a semi-trailer truck, and together with the detailed description, explain the principles of the system, components, and associated methods. No attempt is made to show structural details of the invention in more detail than may be necessary for a fundamental understanding of the system and various ways in which it may be practiced. The following figures of the dump trailer and system for a semi-trailer truck include:

FIG. 4 is a perspective view of a top-front side of a tub of a dump trailer;

FIG. 5 is a side elevation view of the left side of the tub of a dump trailer;

FIG. 6 is a front elevation view of the closed end a tub of a dump trailer;

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

The ensuing description provides general aspects of a dump trailer and system for a semi-trailer truck only. The description is not intended to limit the scope, applicability, or configuration of the disclosure. Rather the ensuing description of the general aspects of the apparatus and system will provide those skilled in the art with an enabling description for implementing the apparatus and/or the system. It is understood that various changes may be made in the function and arrangement of the elements without departing from the spirit and scope set forth in the appended claims. It is noted that while the following description is configured on the dump trailer and/or system for a semi-trailer truck, the system and/or components described herein may be claimed or utilized in other applications as well. For example, the trailer and/or system can be used in other trailers or specialty vehicles. Regarding other applications for the components, during the development of the overall system, various aspects were created that may be used in other trailer applications. For example, the draft arm could be an assembly, or it could be a single forged part. Another example is that the hydraulics system (sometimes referred to as a wet kit) could be retrofitted onto existing dump trailers. As such, the following description directed to a dump trailer application is meant to illustrate general aspects of the dump trailer and system for a semi-trailer truck.

Figure 1:
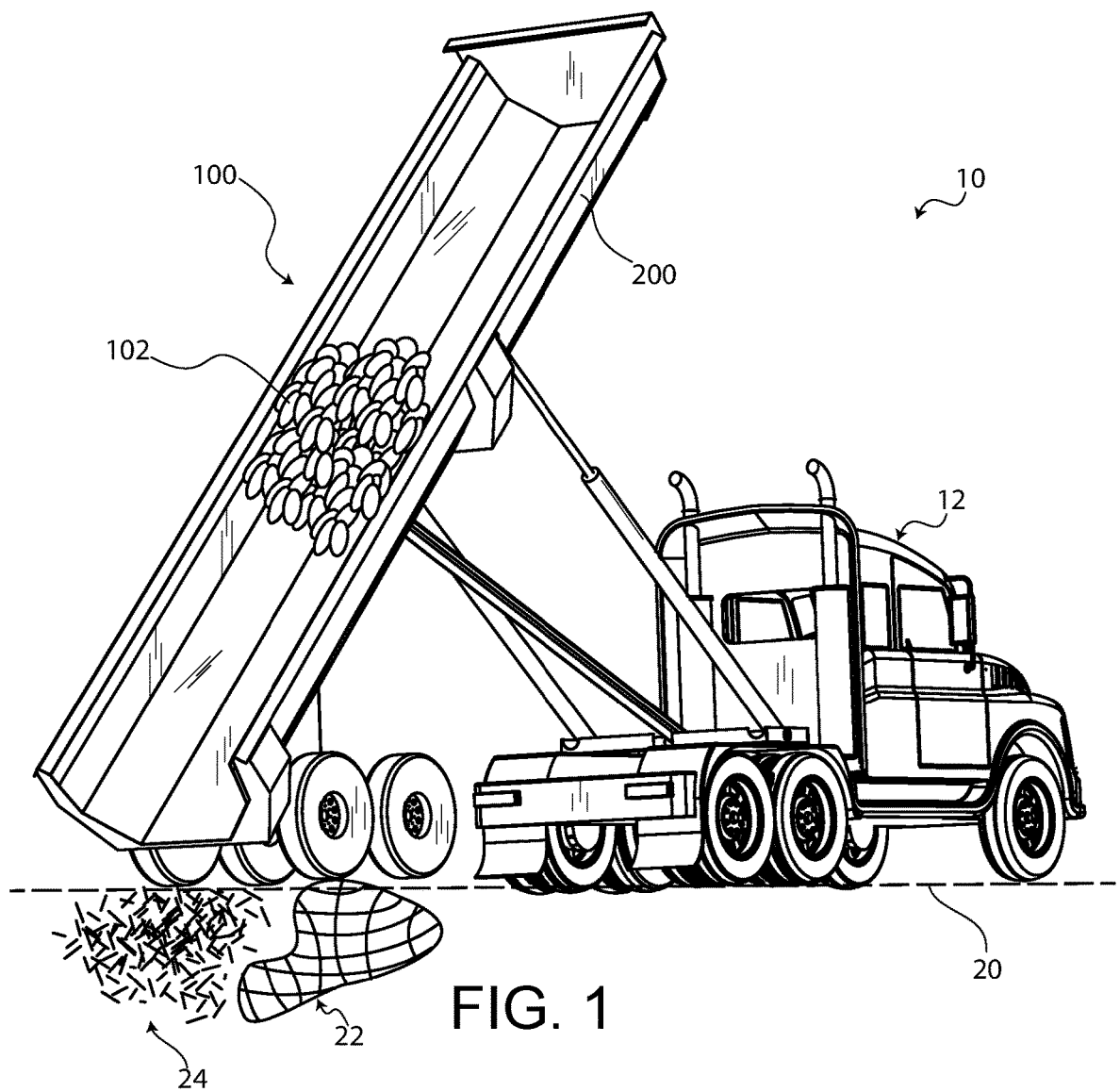
FIG. 1 is a semi-trailer truck having a tractor unit provided with a dump trailer.
Figure 2:
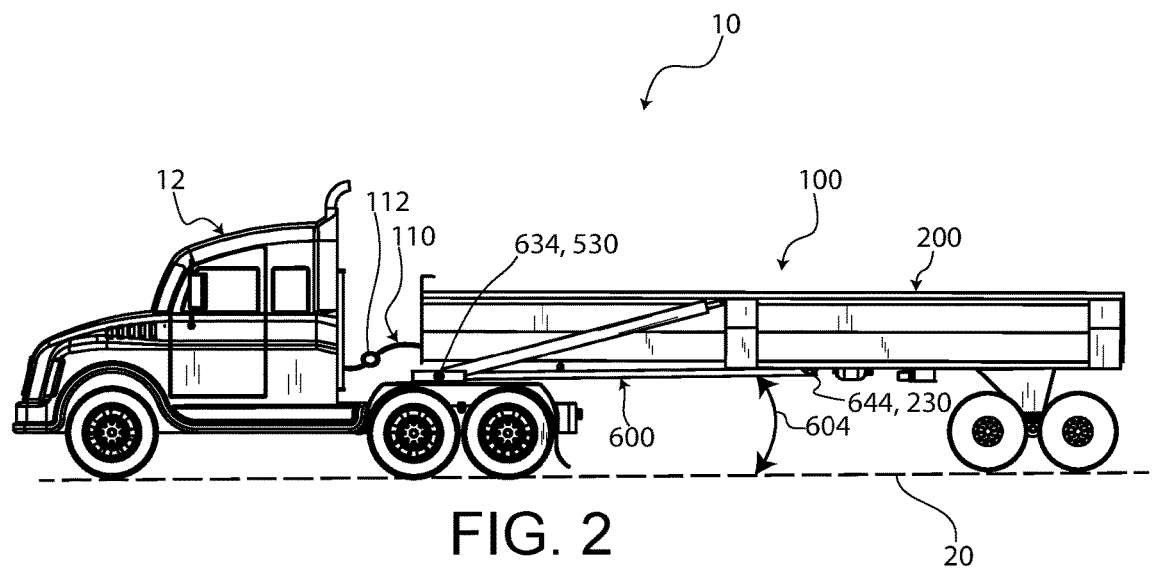
FIG. 2 is a side elevation view of a semi-trailer truck in a transporting condition.

With reference to FIG. 1, a semi-trailer truck 10 generally includes a tractor unit 12 provided with a trailer such as the illustrated dump trailer 100. While the semi-trailer truck 10 is most-often in a transportation condition (as illustrated in FIG. 2), occasionally the dump trailer 100 is positioned in a dump condition as illustrated in FIG. 1. During this dump condition, the weight of the dump trailer 100, and a load 102 contained therein, are high above ground 20. At this elevated position, the dump trailer 100 and load 102 are vulnerable to a rollover event. The ground 20 at most level-ground sites is compacted and capable of providing a stable base for the dump condition. However, certain locations are unstable. One such example location is agriculture fields during quick-turn planning events. When using the dump trailer 100 at an unstable location, the load 102 (e.g. tons of seed) may be quickly, safely, and efficiently dumped. As illustrated in FIG. 1, if rear wheels of the dump trailer 100 are positioned partially on compacted soil 22 and partially on loose-fill 24, the dump condition can escalate to a rollover condition (or worse, a rollover event). The mechanics of this rollover event are that a tub of the dump trailer 100 is raised to cause the load 102 to slide down the tub and eject from an open end of the dump trailer 100. In this condition, most of the weight of the dump trailer 100 and load 102 is supported by the rear wheels (where a pivot point is located). The sudden weight application onto the wheels may cause the loose-fill 24 to unexpectedly compact under the wheels. This unexpected change may result in movement of the wheels and/or shifting which leads to the rollover condition. Traditionally, the operator of the dump process attempts to avoid the rollover event by lowering the tub as fast as possible to try to stabilize the load 102 and change the moment of inertia. Often this is successful, but occasionally the rollover condition escalates to a rollover event. When the unfortunate rollover event occurs, it is expensive and decommissions the semi-trailer truck 10 which is valuable to its operator.

With reference to FIG. 2 showing a side elevation view of the semi-trailer truck 10, the semi-trailer truck 10 most-commonly exists in the illustrated transporting condition. The dump trailer 100 is docked at its most stable location and the semi-trailer truck 10 is capable of making (short or long) trips between locations. The semi-trailer truck 10 is provided with a cable assembly 110 for power and/or information transfer between the dump trailer 100 and the tractor unit 12. In one configuration, the cable assembly 110 is provided with a ground wire, a positive wire, a 7-wire cable, a backup air hose, and a hydraulic line. In other configurations, the cable assembly 110 is minimal and only requires a small amount of power and information to be transferred to/from the trailer 100 (e.g. a control system 800 may be provided with an on-trailer hydraulic pump, accumulator, and valves). Occasionally, the operator of the semi-trailer truck 10 desires to separate the dump trailer 100 from the tractor unit 12, so the cable assembly 110 may be provided with a connector 112 (or multiple connectors if multiple cables exist). The connector 112 enables separation of the cable assembly 110 so a kingpin (FIG. 18, 540, described later herein), that is the only component connecting the trailer 100 to the tractor unit 12, can be detached from the tractor unit 12.

Figure 3:
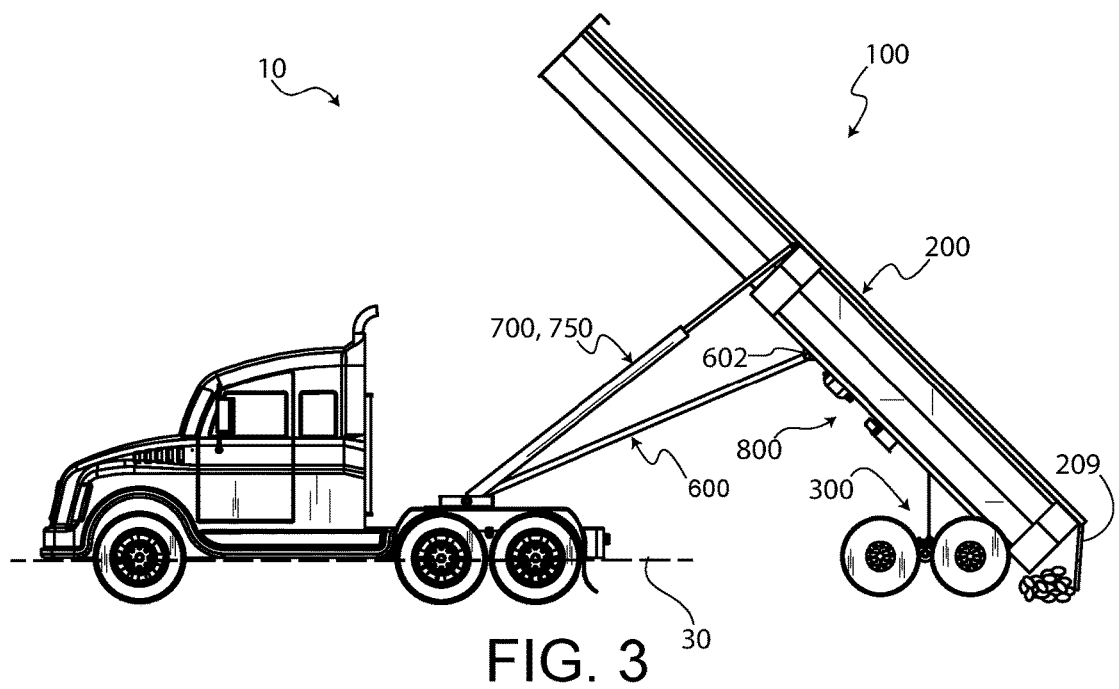
FIG. 3 is a side elevation view of a semi-trailer truck a dumping condition.

With reference to FIG. 3 showing a side elevation view of a semi-trailer truck 10 the dumping condition, the dump trailer 100 may be provided with a chassis plane 30, a tub 200, a rear assembly 300, a coupling plate 500, a draft arm assembly 600, a pair of hydraulic cylinders 700, 750, and a control system 800. The chassis plane 30 is defined by at least two axles of the semi-trailer truck 10 that are coplanar to the chassis plane 30 as best illustrated in FIG. 3. When configured as illustrated, the dump trailer 100 has economic benefits of at least one (or more) of the following: requiring less hydraulic oil, reducing/eliminating the need for a hydraulic system on the tractor unit 12 (which is sometimes referred to as a wet kit—an expensive and not ubiquitous subsystem, reduced manufacturing cost of a draft arm (described later herein), reduced hydraulic cylinder costs, and beneficial control of the dumping process through independent control of hydraulic cylinders that cause movement of the tub. Having provided this brief and non-limiting overview, a more detailed description will be provided.

With reference to FIG. 4 showing a perspective view of a top-front side of a tub 200, the tub 200 may be configured in any of a large number of sizes and layouts such as the illustrated U-shaped channel. The tub 200 defines an interior 202 and an exterior 204. The tub 200 may have partitions on the interior (baffles) or be configured for a single material as illustrated. The as-illustrated tub 200 generally includes a web 210, a left wall 220 (left side), and a right wall 230 (right side). The web 210 serves as a base for the entire tub 200 with the left wall 220 attached directly or as illustrated by a chamfered corner. Alternatively, the left wall 220 and the right wall 230 may be portions of planar or non-planar components of the dump trailer 100 (e.g. portions of a curved section of the web 210, or physical structure extending from the tub 200). The right wall 230 is attached to the web 210 directly or as illustrated by a chamfered corner. This U-shaped channel of the tub 200 is elongated to any reasonable length, but one example is 40 feet long (but small configurations, e.g. 21 feet, and long configurations, e.g. 60 feet, may be provided/required/configured). Additionally, the tub 200 may be constructed out of metal such as steel or aluminum and of any thickness suitable for loads and lifespan requirements (e.g. 3/16 thick steel). At one end of the tub 200 a closed end 206 may be formed by a wall of material (either one-piece or multiple-parts fastened together) and an oppositely disposed open end 208 may be capped by a movable door 209 (FIG. 3) that can be opened automatically during a dumping event (or in a more controlled manner by mechanics).

Figure 7:
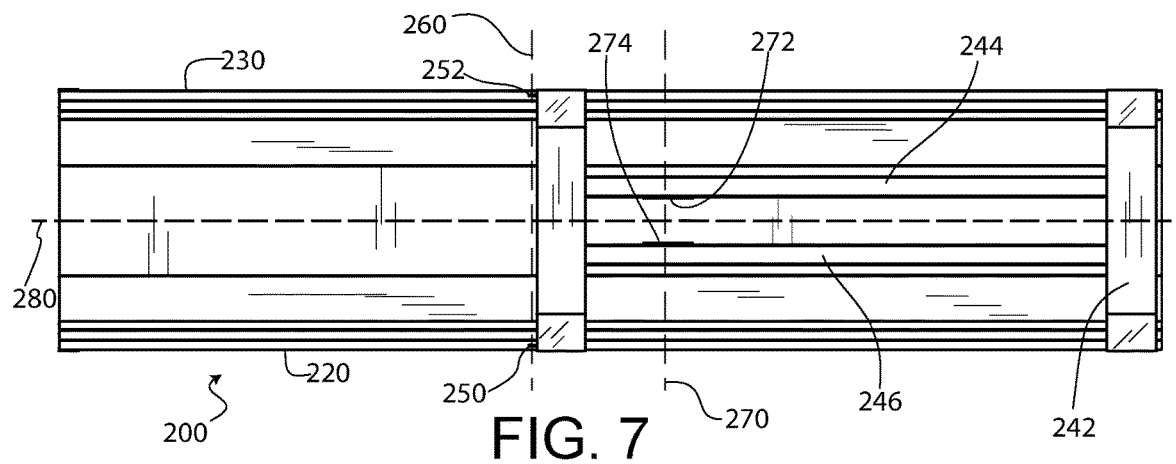
FIG. 7 is a bottom plan view of a tub of a dump trailer.

With reference to FIG. 5 showing a side elevation view of the left side of the tub 200, the tub 200 may be provided with various structural features such as a front stiffening assembly 240, a rear stiffening assembly 242, a left structural beam 244, and a right structural beam 246 (FIG. 7). The front stiffening assembly 240 and rear stiffening assembly 242 are most commonly manufactured out of steel members (as shown) that are attached (e.g. welded) to the exterior 204 of the tub 200. However, it should be noted that the front stiffening assembly 240 and the rear stiffening assembly 242 may be made of any of a variety of fabrication techniques or deleted as required for a particular configuration. In one of the configurations, the front stiffening assembly 240 is located approximately at a mid-way point between the open end 208 and the closed end 206 of the tub 200; and the rear stiffening assembly 242 may be located near the open end 208 of the tub 200 due to the increasing loads applied to this general area during a dumping event. For similar reasons, the left structural beam 244 and the right structural beam 246 (FIG. 7) may be attached to the exterior 204 of the tub 200 and span the distance from the front stiffening assembly 240 and the rear stiffening assembly 242 adjacent to (or adjoining) the web 210.

With continued reference to FIG. 5, the tub 200 may also include a left hinge 250, a right hinge 252, a hinge axis 260, and a center axis 270, and a center hinge 271. The left hinge 250 may take the form of any of a large variety of mechanisms or features capable of receiving the end of a hydraulic cylinder. One example of the left hinge 250 is a plate with a hole for receiving a yoke; another example of the left hinge 250 is a simple bolt for receiving a ball joint (on the end of a hydraulic cylinder as described later). While the manufacturing tolerances of required to properly assemble the dump trailer 100 likely provide enough movement, in one configuration, the use of a ball joint provides rotation and angular displacement for reasons related to adjusting the dump trailer 100 during dumping (described later herein). As shown in FIG. 5, the left hinge 250 may be attached or formed anywhere along the left wall 220 such as the illustrated location between the front stiffening assembly 240 and the closed end 206. Furthermore, the left hinge 250 may be configured as a plate with a hole that it is welded to the exterior 204 of the tub 200, adjacent to the left wall 220 adjoining the front stiffening assembly 240 and near a topside 209.

With reference to FIG. 6 showing a side elevation view of the closed end 206, the right hinge 252 may be formed on the right wall 230. In most applications (but not necessarily all), the left hinge 250 and right hinge 252 are coaxial and generally form the hinge axis 260. The right hinge 252 may take the form of any of a large variety of mechanisms or features capable of receiving the end of a hydraulic cylinder. One example of the right hinge 252 is a plate with a hole for receiving a yoke; another example of the right hinge 252 is a simple bolt for receiving a ball joint (on the end of a hydraulic cylinder as described later). While the manufacturing tolerances of required to properly assemble the dump trailer 100 likely provide enough movement, in one configuration, the use of a ball joint provides rotation and angular displacement for reasons related to adjusting the dump trailer 100 during dumping (described later herein). As also shown in FIG. 6, the right hinge 252 may be attached or formed anywhere along the right wall 230 such as the illustrated location between the front stiffening assembly 240 and the closed end 206 (FIG. 5). Furthermore, the right hinge 252 may be configured as a plate with a hole that is welded to the exterior 204 of the tub 200, adjacent to the right wall 230 and adjoining the front stiffening assembly 240.

With continued reference to FIG. 6, the tub 200 may further include a center axis 270 concentric to a center hinge 271 configured as one single hinge member. The center hinge 271 may be a simple pivot point or, as illustrated, as pair of hinges such a center-left hinge 272 and a center-right hinge 274. FIG. 6 also shows that the tub 200 may include a center plane 280. The center plane 280 is generally located between the left wall 220 and the right wall 230 in a symmetrical configuration (sometime referred to herein as symmetrically formed).

With reference to FIG. 7 showing a bottom plan view of the tub 200, the center-left hinge 272 may be attached to the left structural beam 244 and the right center hinge 274 may be attached to the right structural beam 246. The center hinge 271 (either as a single feature or the pair including the center-left hinges 272 and the center-right hinge 274) form the center axis 270. The center axis 270 is generally formed parallel to the hinge axis 260 for purposes of controlling movement of the tub 200 as described herein. With continued reference to FIG. 7, the center plane 280 is symmetrical to the left wall 220 and the right wall 230 whereby the hinge axis 260 and center axis 270 pierce through the center plane 280.

Figure 8:
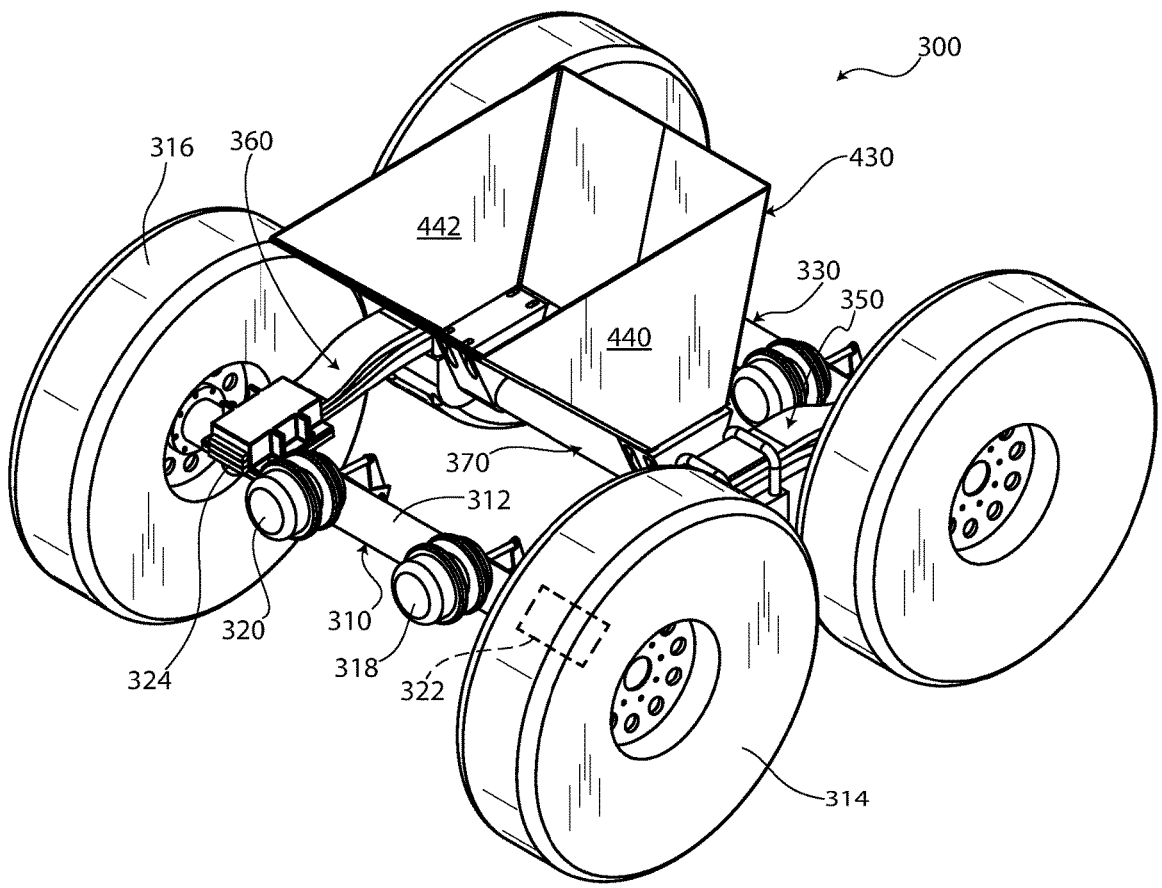
FIG. 8 is a top perspective view of a rear assembly of a dump trailer.

With reference to FIG. 8 showing a top perspective view of a rear assembly 300, the rear assembly 300 may be provided with a front axle assembly 310, a rear axle assembly 330, a left spring assembly 350, a right spring assembly 390, a pyramid 430, and a rear pivot 450.

With continued reference to FIG. 8, the front axle assembly 310 includes an axle 312, a left wheel 314, a right wheel 316, a left damper 318, and a right damper 320. The left wheel 314 and right wheel 316 are attached to the axle 312 in a manner well known in the art, specifically with hubs that may (or may not include) brakes. If configured with air springs as illustrated in FIG. 8, the left damper 318 and the right damper 320 are attached to the leading side of the axle 312 and are provided with a detailed 4-bar mechanism that is known in the art. The axle 312 may also include a left spring contact 322 and a right spring contact 324, both formed on the axle 312 for receiving spring assemblies (e.g. Left spring assembly 350 and right spring assembly 390).

Figure 9:
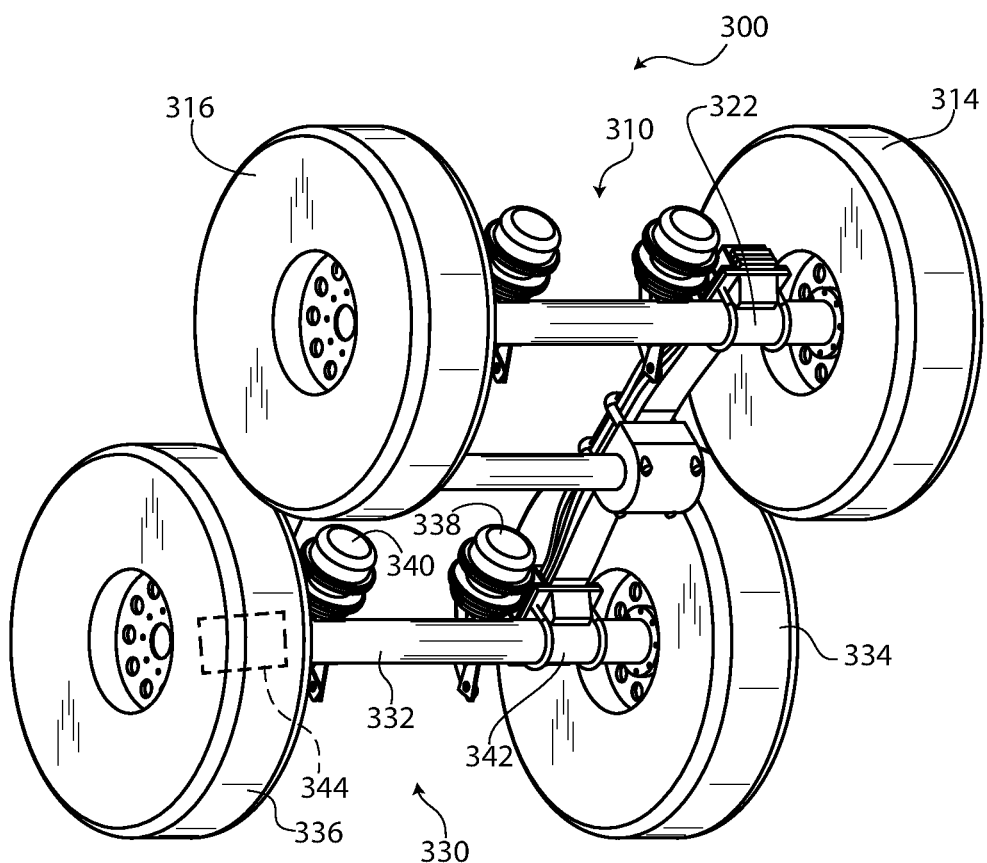
FIG. 9 is a bottom perspective view of a rear assembly of a dump trailer.

With reference to FIG. 9 showing a bottom perspective view of the rear assembly 300, the rear axle assembly 330 includes an axle 332, a left wheel 334, a right wheel 336, a left damper 338 and a right damper 340. The left wheel 334 and right wheel 336 are attached to the axle 332 in a manner as described with the front axle assembly 310. If configured with air springs, the left damper 338 and the right damper 340 are attached to the leading side of the axle 332. The axle 332 may also include a left spring contact 342 and a right spring contact 344, both formed on the axle 332 for receiving spring assemblies.

Figure 10:
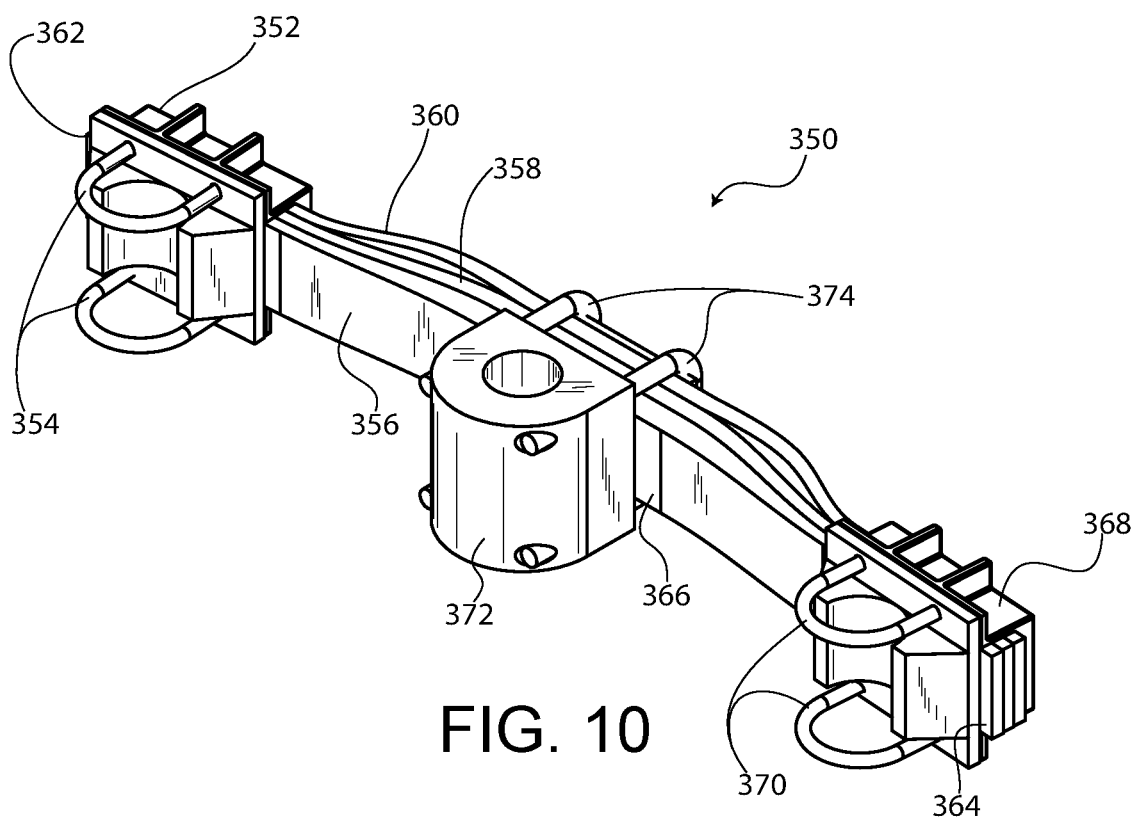
FIG. 10 is a perspective view of a left spring assembly of a dump trailer.

With reference to FIG. 10 showing a perspective view of the left spring assembly 350, the left spring assembly 350 may take any of a variety of configurations such as the illustrated configuration including a first axle attachment 352, a pair of u-bolts 354, a main leaf spring 356, a second leaf spring 358, and a third leaf spring 360. The main leaf spring 356 has a first end 362 and an oppositely disposed second end 364 with a midpoint 366. At the first end 362 of the main leaf spring 356, the plurality of individual springs 356, 358, 360 are held together by the first axle attachment 352 and the u-bolts 354. At the second end 364 of the main leaf spring 356, the left spring assembly 350 may also include a second axle attachment 368 and a pair of u-bolts 370 capture the springs 356, 358, 360 as illustrated. At the midpoint 366 of the main leaf spring 356, the left spring assembly 350 may be provided with hinge assembly 372 and a pair of u-bolts 374. The hinge assembly 372 adjoins the main leaf spring 356 and the u-bolts 374 capture the second leaf spring 358 and third leaf spring 360.

Figure 11:
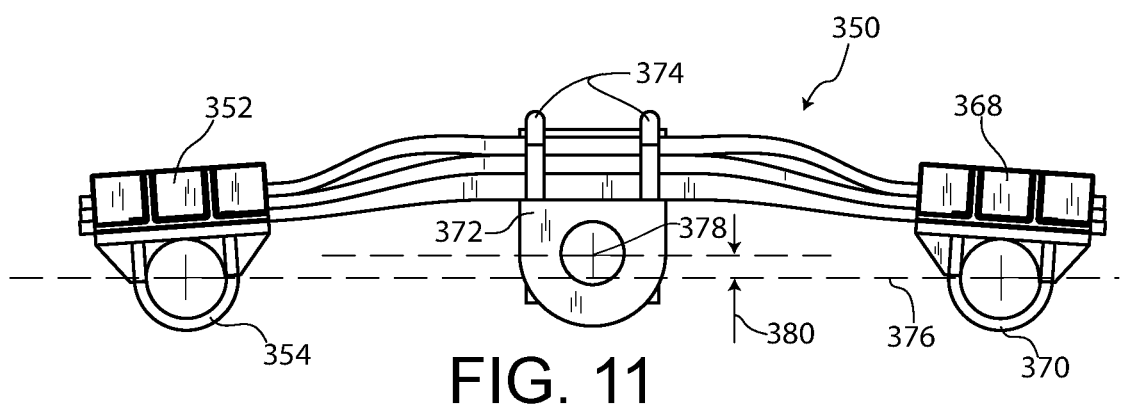
FIG. 11 is a side view of a left spring assembly of a dump trailer.

With reference to FIG. 11 showing a side view of the left spring assembly 350, the left spring assembly 350 includes an axle plane 376. The axle plane 376 is defined by the axes (plural of axis) of rotation of the axle 312 of the front axle assembly 310 and the axle 332 of the rear axle assembly 330, both of the center of rotations of the axles 312, 332 reside in the axle plane 376 as illustrated in FIG. 11. The hinge assembly 372 includes a pivot axis 378 about which the tub 200 rotates. There may be a left deflection distance 380 defined as the distance between the pivot axis 378 and the axle plane 376.

Figure 12:
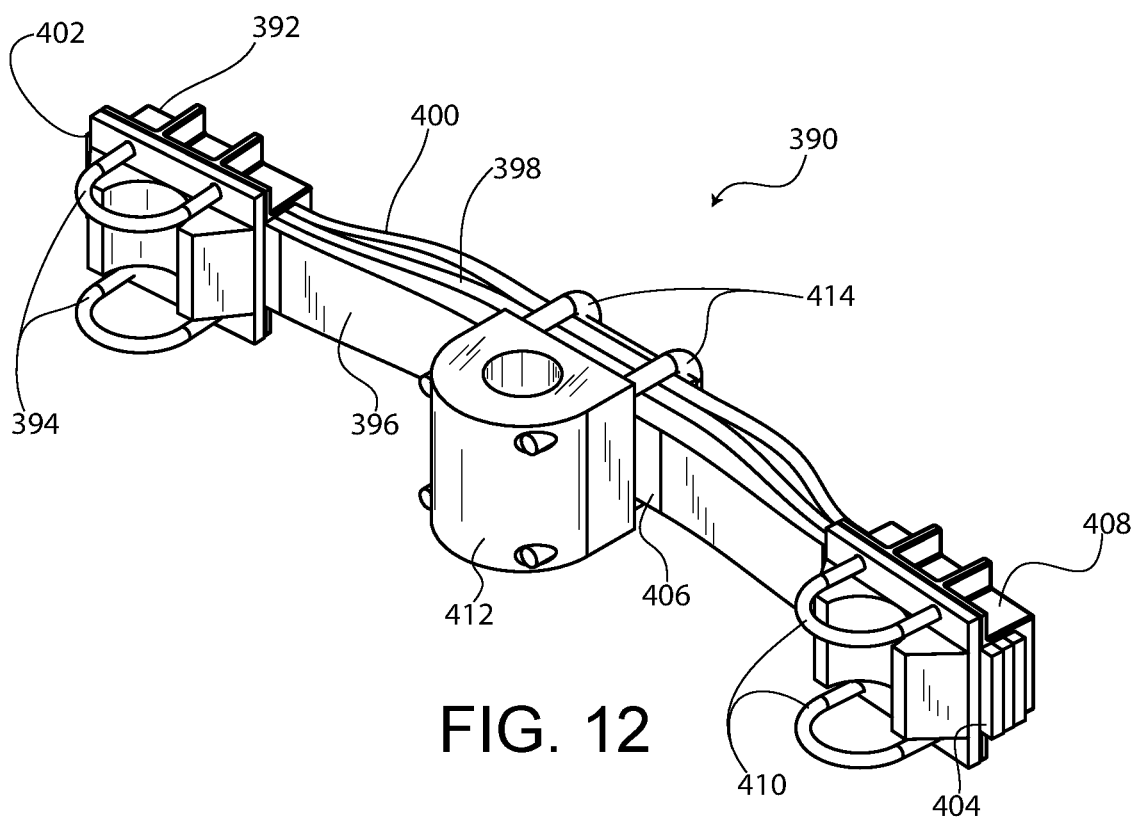
FIG. 12 is a perspective view of a right spring assembly of a dump trailer.

With reference to FIG. 12 showing a perspective view of a right spring assembly 390, the right spring assembly 390 may take any of a variety of configurations such as the illustrated configuration including a first axle attachment 392, a pair of u-bolts 394, a main leaf spring 396, a second leaf spring 398, and a third leaf spring 400. The main leaf spring 396 has a first end 402 and an oppositely disposed second end 404 with a midpoint 406. At the first end 402 of the main leaf spring 396, the plurality of individual springs 396, 398, 400 are held together by the first axle attachment 392 and the u-bolts 394. At the second end 404 of the main leaf spring 396, the right spring assembly 390 may further include a second axle attachment 408 and a pair of u-bolts 410 capture the springs 396, 398, 400 as illustrated. At the midpoint 406 of the main leaf spring 396, the right spring assembly 410 may be provided with hinge assembly 412 and a pair of u-bolts 414. The hinge assembly 412 adjoins the main leaf spring 396 and the u-bolts 414 capture the second leaf spring 398 and the third leaf spring 400.

Figure 13:
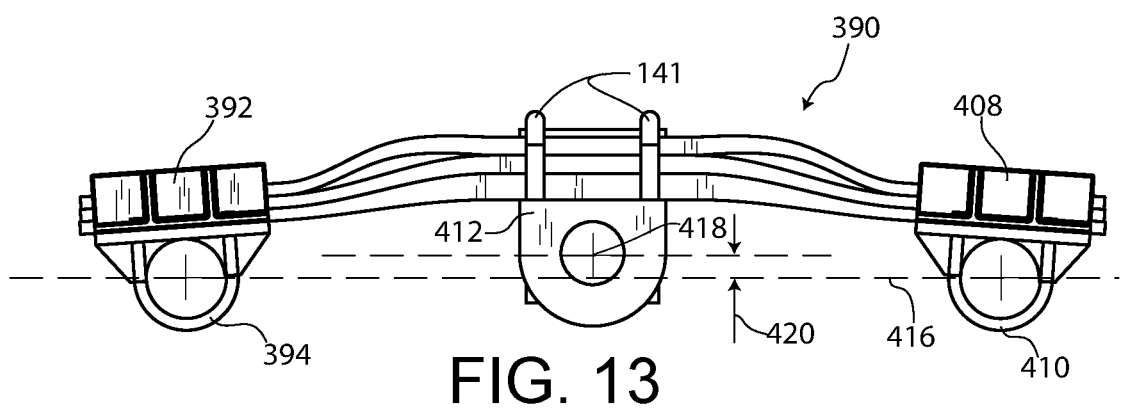
FIG. 13 is a side view of a right spring assembly of a dump trailer.

With reference to FIG. 13 showing a side view of the right spring assembly 390, the right spring assembly 390 includes an axle plane 416. The axle plane 416 is defined by the axes (plural of axis) of the axle 312 of the front axle assembly 310 and the axle 332 of the rear axle assembly 330, both of the center of rotations of the axles 312, 332 reside in the this axle plane 416 as illustrated in FIG. 13. The hinge assembly 412 includes a pivot axis 418 about which the tub 200 rotates. There is a left deflection distance 420 defined as the distance between the pivot axis 418 and the axle plane 416.

Figure 14:
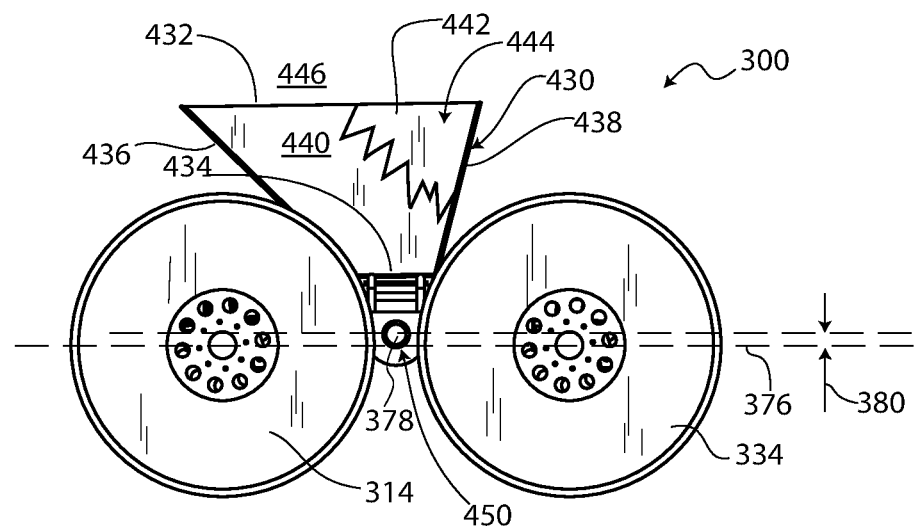
FIG. 14 is a of a side elevation view of a rear assembly dump trailer.

With reference to FIG. 14 showing a side elevation view of the rear assembly 300, the pyramid 430 may be configured as illustrated with a top 432, a bottom 434, a front 436, a back 438, a left 440, and a right 442 (FIG. 8) to generally form an inverted pyramid shape. The top 432, the bottom 434, the front 436, the back 438, the left 440, and the right 442 may be constructed out of a variety of materials and/or manufacturing processes, such as out of cold-rolled sheet steel that is welded into a shape defining an interior portion 444 and an exterior portion 446. The interior portion 444 is often configured with various mechanical items such as components of a braking system or other sub-systems that need a protected location. The top 432 of the pyramid 430 may be attached to the tub 200 in any of a variety of manners, such as by welding. If, for example, the pyramid 430 is welded to the tub 200, the left 440 is welded to the left structural beam 244 (FIG. 7) near the rear stiffening assembly 242. This illustrated configuration would also result in the right 442 being welded to the right structural beam 246 (FIG. 7).

With continued reference to FIG. 14, the rear assembly 300 is further provided with a rear pivot 450. The rear pivot 450 may be a solid or hollow circular profile, such as the illustrated solid bar of steel. The rear pivot 450 is installed as illustrated so that the rear pivot 450 is attached to the hinge assembly 372 and the hinge assembly 412 (FIG. 12) to provide an axis of rotation about which the tub 200 (and intermediary pyramid 430) pivots.

Figure 15:
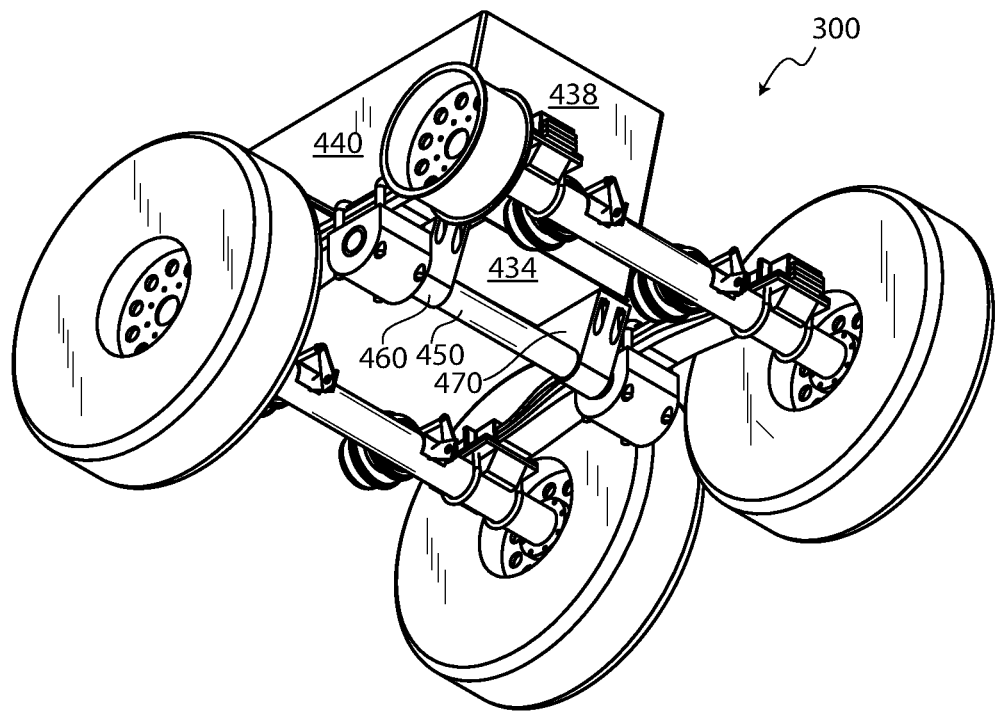
FIG. 15 is a perspective view of a bottom of a pyramid of a dump trailer.

With reference to FIG. 15 showing a perspective view of the bottom 434 of the pyramid 430 with the left wheel 334 of the rear axle assembly 330 removed, the rear assembly 300 is further provided with provisions for attaching the pyramid 430 to the rear pivot 450, such as left pyramid mount 460 and right pyramid mount 470. The left pyramid mount 460 is attached to the bottom 434 near the left 440 of the pyramid 430. The right pyramid mount 470 is attached to the bottom 434 near the left 440 of the pyramid 430. The left pyramid mount 460 is provided with a hinge such as a hole 462; and the right pyramid mount 470 is provided with a hinge such as a hole 472. When assembled as best illustrated in FIG. 15, the hole 462 of the left pyramid mount 460 is coaxial to the rear pivot 450 and capable of forming an axis of rotation about which the tub 200 may rotate relative to the rear assembly 300. Furthermore, the hole 472 of the right pyramid mount 470 is coaxial to the hole 462 of the left pyramid mount 460 and the rear pivot 450.

Figure 16:
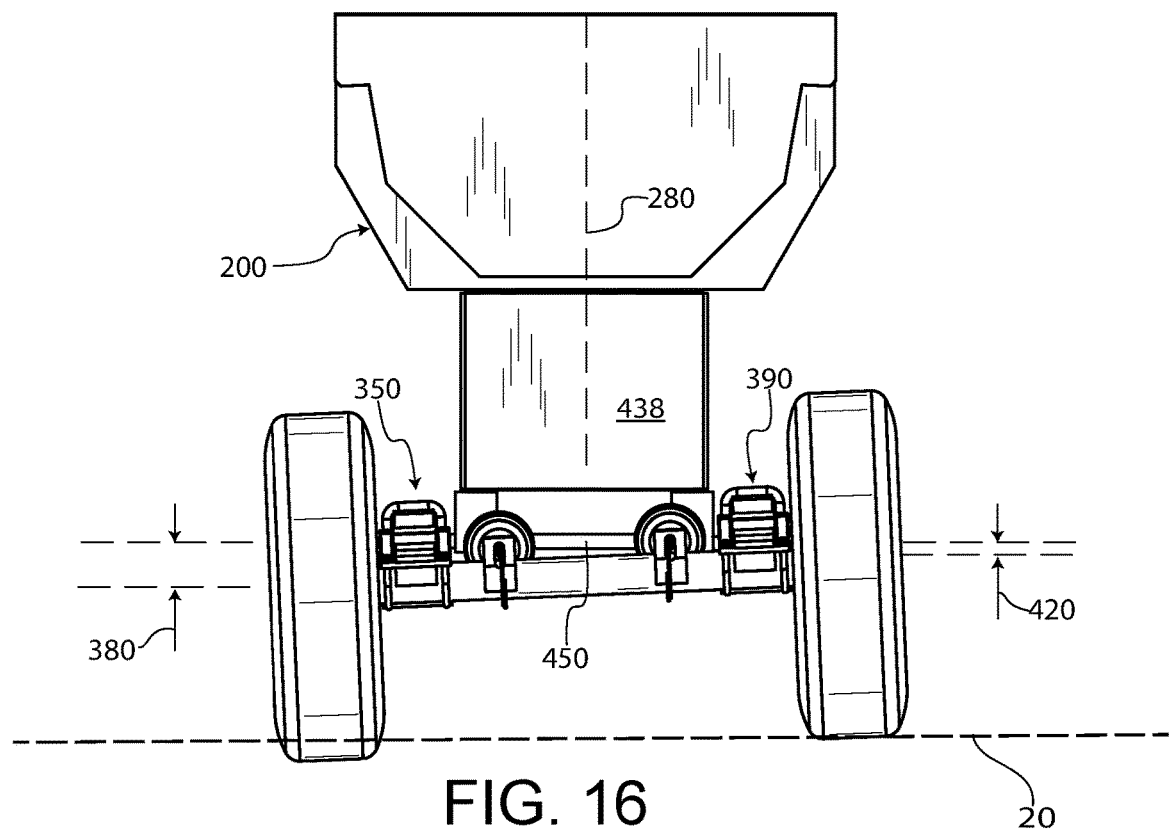
FIG. 16 is a rear elevation view of the rear assembly of a dump trailer.

With reference to FIG. 16 showing a rear elevation view of the rear assembly 300 wherein the ground 20 is not level, the components of the rear assembly 300 cooperate to provide independent movement of the tub 200 relative to the rear assembly 300. This independent movement is best illustrated by the left deflection distance 380 of the left spring assembly 350 and the left deflection distance 420 of the right spring assembly 390 in a levelling process best illustrated by keeping rear pivot 450 'level' to the ground 20. This leveling process is described herein, but as described one of the purposes is to keep the tub 200 and its load perpendicular to the ground 20 as illustrated by the center plane 280 of the tub 200 as shown. As shown in FIG. 16, the center plane 280 is not perpendicular to the ground 20, therefore the tub 200 is in a canted condition wherein the load held in the tub 200 is unstable when in the dumping condition.

Figure 17:
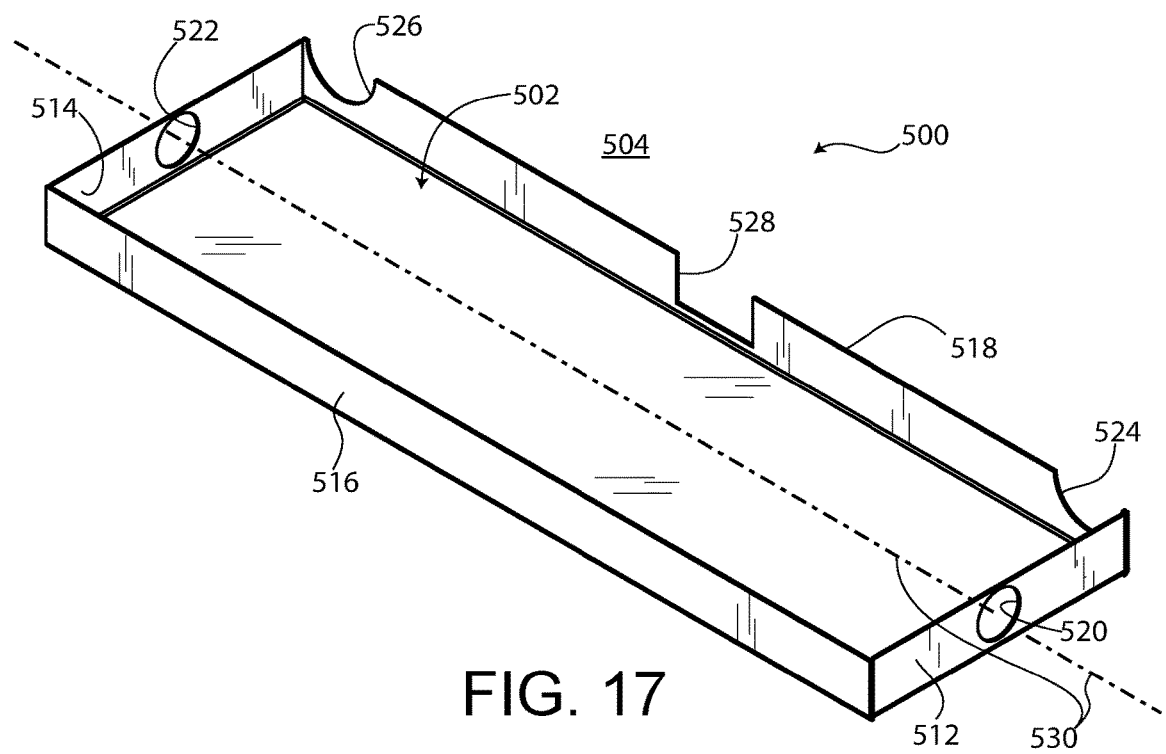
FIG. 17 is a perspective view of a coupling plate of a dump trailer.

With reference to FIG. 17 showing a perspective view of a coupling plate 500, the coupling plate 500 may take a number of forms, but one particular form is illustrated as a cuboid shape with a top-surface removed. In this illustrative example, the coupling plate 500 generally defines an interior 502 and an exterior 504 including by a base 510, a left side 512, a right side 514, front side 516 and a back side 518. The left side 512, right side 514, front side 516, and back side 518 may be integrally formed with the base 510 (e.g. bent out of a flat material) or welded into the illustrated configuration. The coupling plate 500 may have additional features such as: partitions, features, bearing surfaces, brackets, and cable routing features. Additional features illustrated in FIG. 17 include: a left hole 520, a right hole 522, a left hydraulic cylinder clearance 524, a right hydraulic cylinder clearance 526, and a draft arm clearance 528. The left hole 520 is formed in the left side 512 and the right hole 522 is formed in the right side 514 to form a coupling axis 530. The left hole 520 and the right hole 522 are coaxial to the coupling axis 530.

Figure 18:
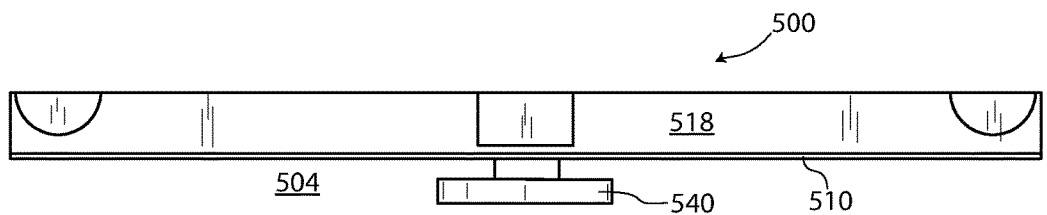
FIG. 18 is a rear elevation view of the coupling plate of a dump trailer.

With reference to FIG. 18 showing a rear elevation view of the coupling plate 500, the coupling plate 500 is provided with a feature for attaching the dump trailer 100 to the semi-trailer truck 10 such as a kingpin 540. The kingpin 540 is formed on the exterior 504 of the base 510. The kingpin 540 is common in industry and serves to make the dump trailer 100 readily and removably attached to the semi-trailer truck 10 to enable different configurations of the semi-trailer truck 10.

Figure 19:
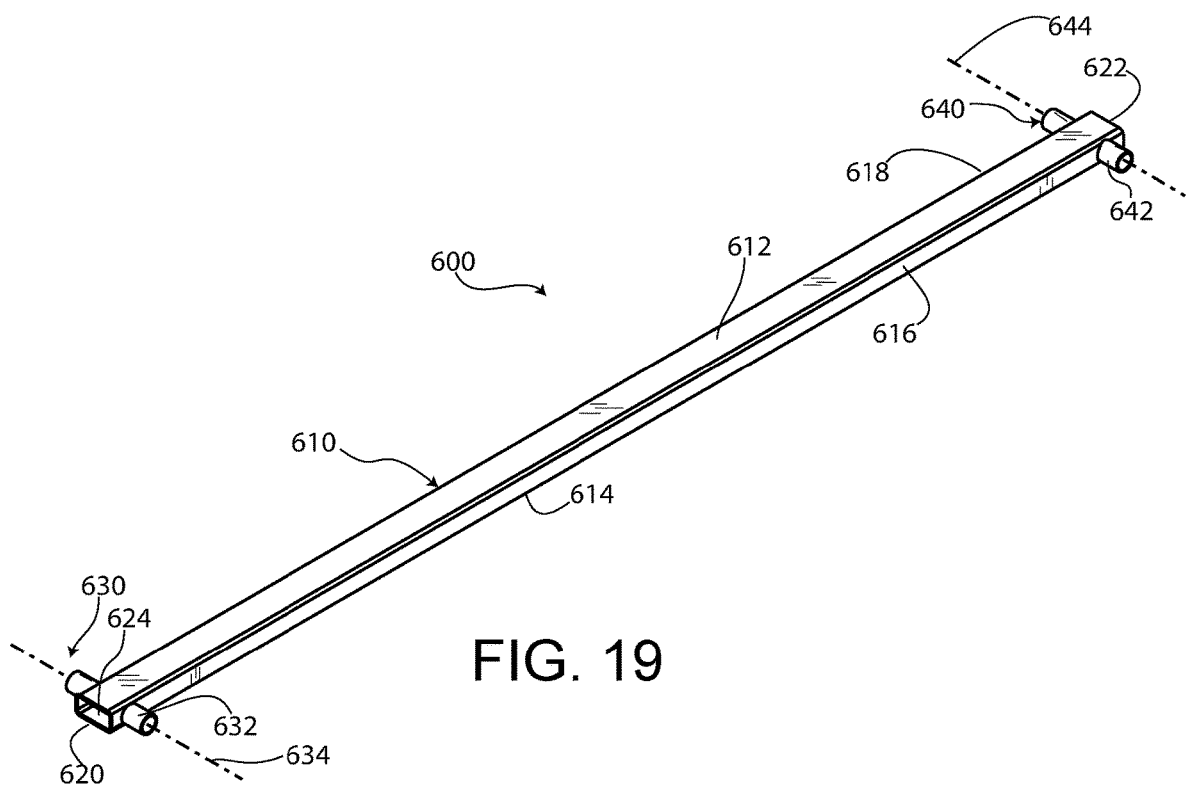
FIG. 19 is a front top perspective view of a draft arm assembly of a dump trailer.

With reference to FIG. 19 showing a front top perspective view of a draft arm assembly 600, the draft arm assembly 600 may take a variety of configurations including a tube 610 with a rectangular profile (e.g. a steel tube). The tube 610 includes a top side 612, a bottom side 614, a left side 616, a right side 618, a proximal end 620, and a distal end 622. The sides 612, 614, 616, 618 may create an elongated tube capable of defining a protected interior portion 624 for receiving cables or other components (e.g. cable assembly 110). The draft arm assembly 600 is provided with a proximal hinge 630 and a distal hinge 640 located at the proximal end 620 and the distal end 622, respectively. The proximal hinge 630 and distal hinge 640 may take any of a number of forms, but in the illustrated configuration are configured as a proximal tube 632 and a distal tube 642 capable of receiving individual pins/rods as described later herein. The proximal tube 632 passes through the left side 616 and the right side 618 of the steel tube 610. The distal tube 642 passes through the left side 616 and the right side 618 near the distal end 622.

Figure 20:
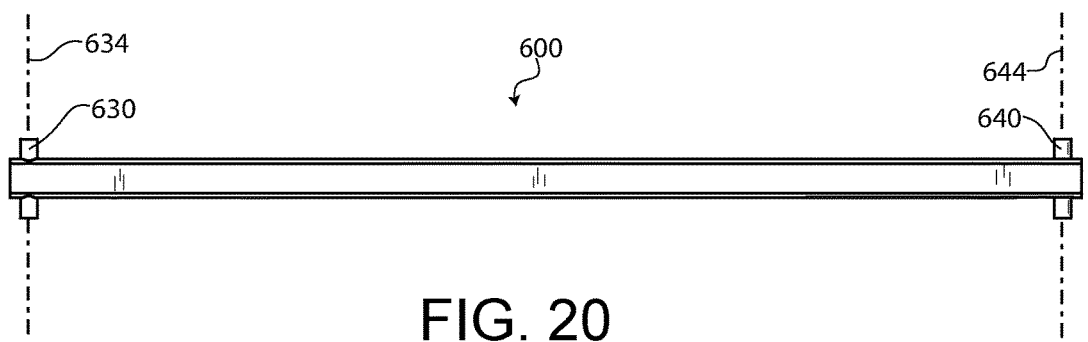
FIG. 20 is a top plan view of the draft arm assembly of a dump trailer.

With reference to FIG. 20 showing a top plan view of the draft arm assembly 600, the proximal hinge 630 defines a draft arm proximal axis 634 and the distal hinge 640 defines a draft arm distal axis 644.

Figure 21:
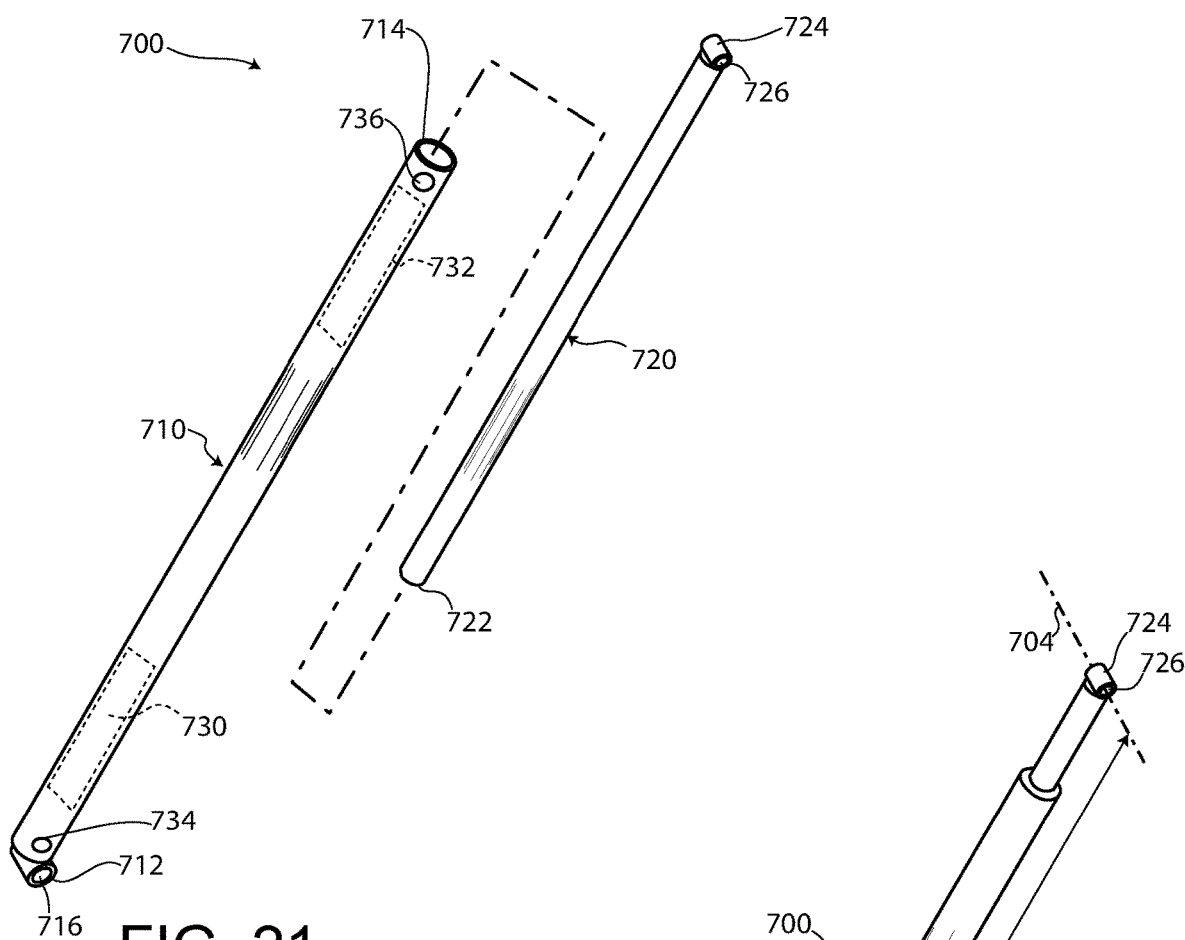
FIG. 21 is a perspective view of a left hydraulic cylinder of a dump trailer.

With reference to FIG. 21 showing a perspective view of a left hydraulic cylinder 700 in an exploded condition, the left hydraulic cylinder 700 may be any of a large variety of hydraulic cylinders, such as the illustrated single-stage cylinder. With the single-stage cylinder, a compressed length is roughly one-half a fully-extended length. In the illustrated configuration, the compressed length is about 13 feet and the extended length is about 20 feet. The left hydraulic cylinder 700 is provided with a body 710 that includes a cap end head 712 and a rod end head 714. The cap end head 712 is provided with an attachment feature such as the a hole 716 (as illustrated). The rod end head 714 is provided with a sealing feature configured to receive a piston rod 720. The piston rod 720 is provided with a piston end 722 for sealing against the body 710 and creating a coupling-side cavity 730 disposed between the cap end head 712 and the piston end 722 of the piston rod 720. The left hydraulic cylinder 700 may also be provided with a rod-side cavity 732 disposed between the rod end head 714 of the body 710 and the piston end 722 of the piston rod 720. The coupling-side cavity 730 and the rod-side cavity 732 change volumes depending on the position of the piston rod 720 as it extends from and retracts into the body 710. In order to move fluid, almost exclusively a liquid (e.g. hydraulic oil), into and out of the cavities 730, 732, the left hydraulic cylinder 700 is provided with fittings such as a coupling-side fitting 734 and a rod-side fitting 736. The locations and existing of these fittings can be as illustrated in FIG. 21 or moved to different locations on the left hydraulic cylinder 700 (e.g. the coupling-side fitting 734 may be located at the end of the piston rod 720 whereby the length of the piston rod 720 acts as a supply line for the fluid.

With continued reference to FIG. 21, the left hydraulic cylinder 700 is provided with an attachment hinge 724 formed on the piston rod 720 at a location oppositely disposed from the piston end 722. The Attachment hinge 724 may take the form of any of a variety of connection mechanisms used in industry, such as a hole 726 as illustrated. The attachment hinge 724 may be a rigid attachment wherein the left hydraulic cylinder 700 remains perpendicular to the attachment point, or it may have a floating configuration wherein the left hydraulic cylinder 700 may move a few degrees from a perpendicular orientation relative to the object it is attached to (e.g. the tub 200 as described herein).

Figure 22:
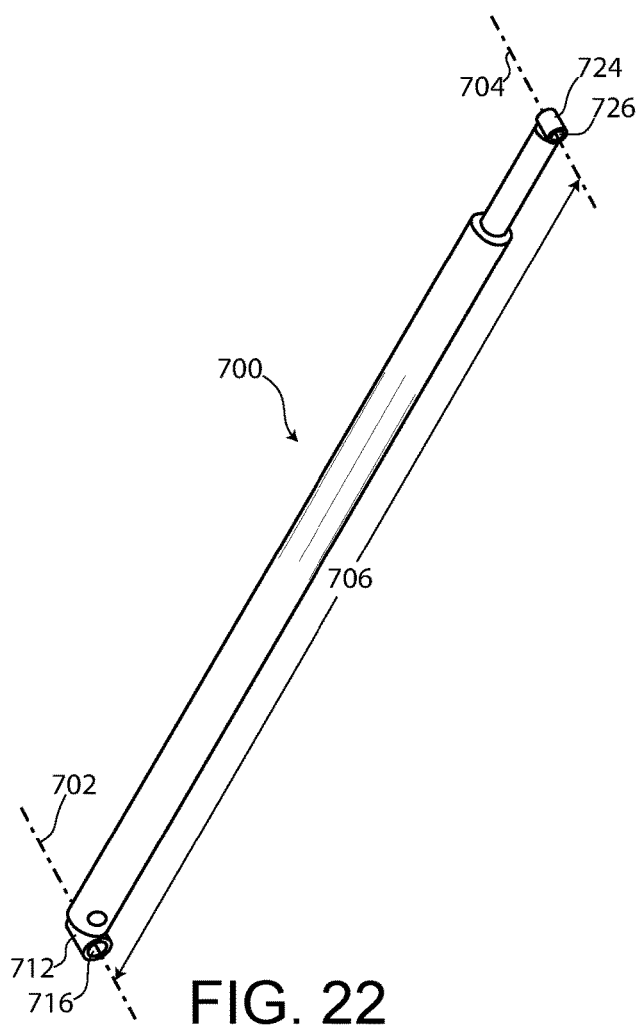
FIG. 22 is an assembled condition of the left hydraulic cylinder of a dump trailer.

With reference to FIG. 22 showing an assembled condition of the left hydraulic cylinder 700, the left hydraulic cylinder 700 includes a proximal hinge axis 702 and a distal hinge axis 704. The proximal hinge axis 702 is coaxial to the hole 716 formed in the cap end head 712. The distal hinge axis 704 is coaxial to the hole 726 formed in the attachment hinge 724. In most situations, the proximal hinge axis 702 is parallel to the distal hinge axis 704 and separated by a left hydraulic cylinder length 706 that is variable. In a load leveling event, the distal hinge axis 704 and the proximal hinge axis 702 may be slightly non-parallel in order to adjust to variable ground as will be described later herein.

Figure 23:
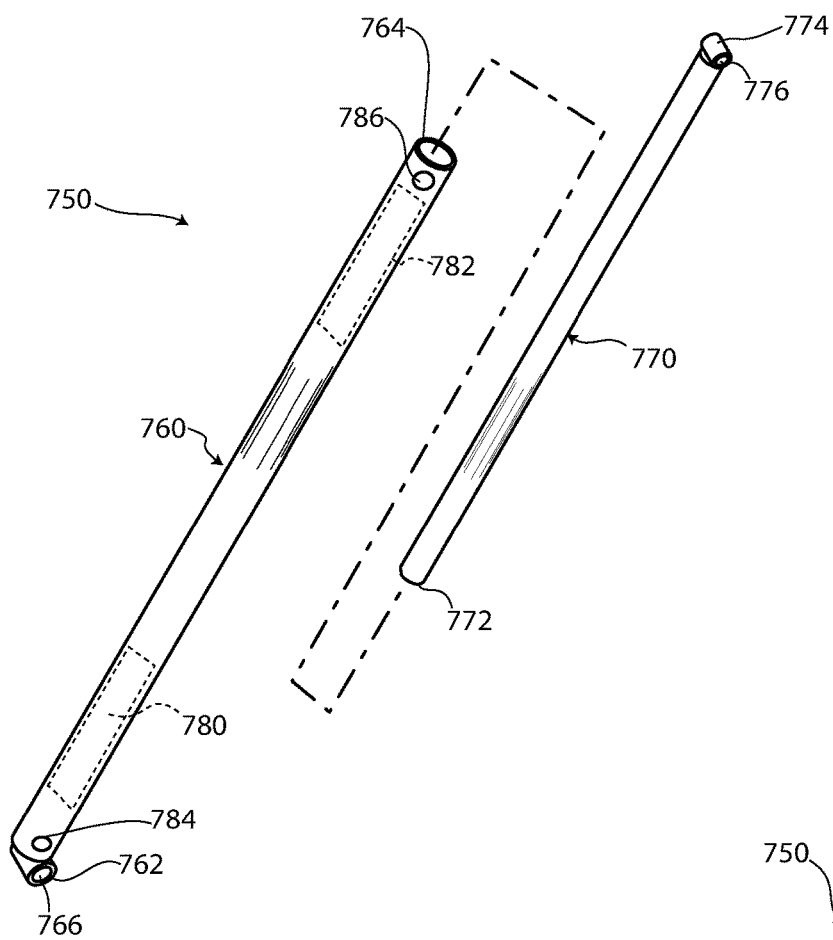
FIG. 23 is a perspective view of a right hydraulic cylinder (in an exploded condition) of a dump trailer.

With reference to FIG. 23 showing a perspective view of a right hydraulic cylinder 750 in an exploded condition, the right hydraulic cylinder 750 may be similar to the right hydraulic cylinder 700. The right hydraulic cylinder 750 is provided with a body 760 that includes a cap end head 762 and a rod end head 764. The cap end head 762 is provided with an attachment feature such as the hole 766. The rod end head 764 is provided with a sealing feature configured to receive a piston rod 770. The piston rod 770 is provided with a piston end 772 for sealing against the body 760 and creating a coupling-side cavity 780 disposed between the cap end head 762 and the piston end 772 of the piston rod 770. The right hydraulic cylinder 750 may also be provided with a rod-side cavity 782 disposed between the rod end head 764 of the body 760 and the piston end 772 of the piston rod 770. The coupling-side cavity 780 and the rod-side cavity 782 change volumes depending on the position of the piston rod 770 as it extends from and retracts into the body 760. In order to move fluid, almost exclusively a liquid (e.g. hydraulic oil), into and out of the cavities 780, 782, the right hydraulic cylinder 750 is provided with fittings such as a coupling-side fitting 784 and a rod-side fitting 786. The locations and existing of these fittings can be as illustrated in FIG. 23 or moved to different locations on the right hydraulic cylinder 750 (e.g. the coupling-side fitting 784 may be located at the end of the piston rod 770 whereby the length of the piston rod 770 acts as a supply line for the fluid.

With continued reference to FIG. 23, the right hydraulic cylinder 750 is provided with an attachment hinge 774 formed on the piston rod 770 at a location oppositely disposed from the piston end 772. The Attachment hinge 774 may take the form of any of a variety of connection mechanisms used in industry, such as a hole 776 as illustrated. The attachment hinge 774 may be a rigid attachment wherein the right hydraulic cylinder 750 remains perpendicular to the attachment point, or it may have a floating configuration wherein the right hydraulic cylinder 750 may move a few degrees from a perpendicular orientation relative to the object it is attached to (e.g. the tub 200 as described herein).

Figure 24:
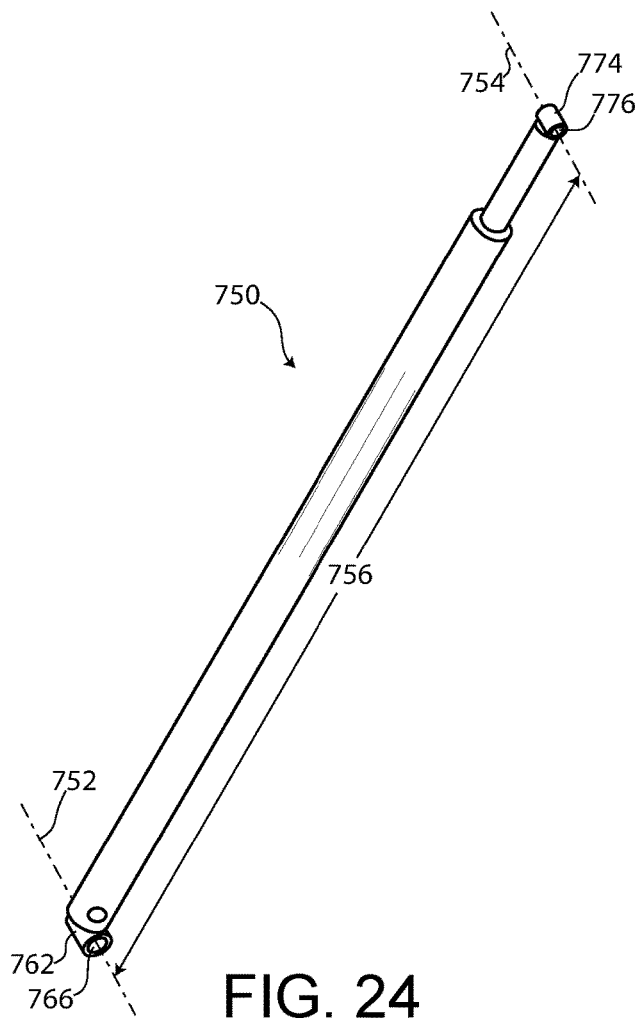
FIG. 24 is an assembled condition of the right hydraulic cylinder of a dump trailer.

With reference to FIG. 24 showing an assembled condition of the right hydraulic cylinder 750, the right hydraulic cylinder 750 includes a proximal hinge axis 752 and a distal hinge axis 754. The proximal hinge axis 752 is coaxial to the hole 766 formed in the cap end head 762. The distal hinge axis 754 is coaxial to the hole 776 formed in the attachment hinge 774. In most situations, the proximal hinge axis 752 is parallel to the distal hinge axis 754 and separated by a right hydraulic cylinder length 756 that is variable. In a load leveling event, the distal hinge axis 754 and the proximal hinge axis 752 may be slightly non-parallel in order to adjust to variable ground as will be described later herein.

Figure 25:
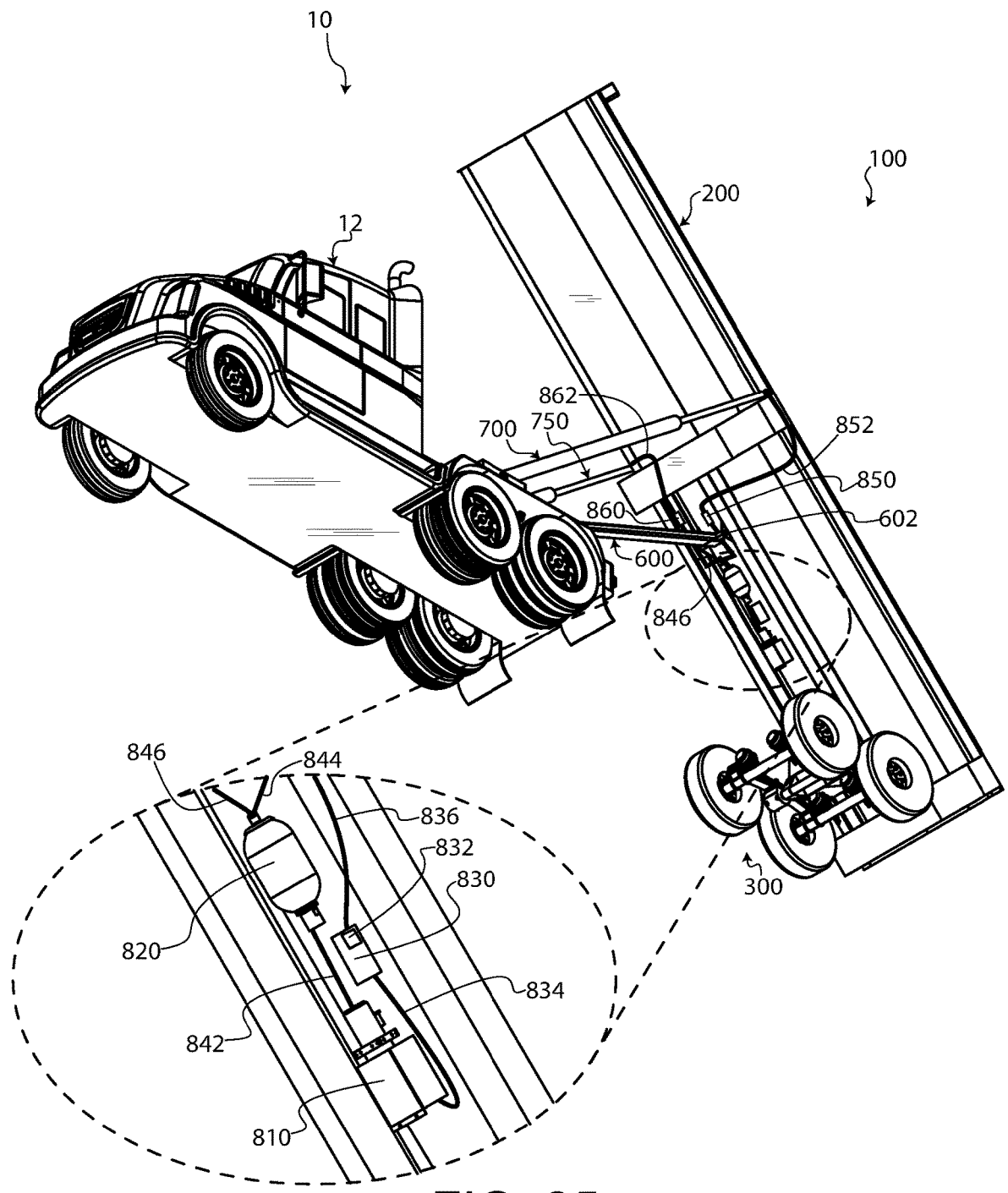
FIG. 25 is a bottom front perspective view of a semi-trailer truck.

With reference to FIG. 25 showing a bottom front perspective view of the semi-trailer truck 10 and one illustrative configuration of a control system 800, the control system 800 may include a hydraulic pump 810, an accumulator 820, a controller 830, and a plurality of hydraulic lines 840 (e.g. a pump-to-accumulator line 842, an accumulator-to-left-valve line 844, an accumulator-to-right-valve line 846), a left control valve 850, and a right control valve 860. While these components are listed, it is specifically understood that some or all of these may be eliminated or relocated (e.g. to the tractor unit 12) and the scope of the present illustrated system. The control system 800 is shown on the exterior 204 of the tub 200, specifically on the exterior of the web 210 for illustrative purpose only. These components may be enclosed in a housing or somewhere protected on the dump trailer 100 (e.g. inside the pyramid 430). The hydraulic pump 810 may be any of a variety of pumps configured to pressurized fluid (specifically liquid and most likely a hydraulic oil). The hydraulic pump 810 only has so much capacity therein, so the pump-to-accumulator line 842 is provided for conveying the pressurized fluid from the hydraulic pump 810 to the accumulator 820 where a variable amount of fluid can be stored. Ideally, this accumulator 820 will be configured so components powered by pressurized fluid therein can be quickly transferred without waiting for the hydraulic pump 810 to do all of the pressurization on-demand (e.g. with about 10 to 50 gallons of hydraulic oil). Rather, the pressurization is completed during a period of time leading up to the call for pressurized fluid. The pressurized fluid may be transfer from the accumulator 820 to the left hydraulic cylinder 700 and the right hydraulic cylinder 750 via lines. In one configuration, a pair of hydraulic lines referred to herein as the accumulator-to-left-valve line 844 and the accumulator-to-right-valve line 846 transfer the fluid to the left control valve 850 and the right control valve 860, respectively. The control system 800 further includes a left supply line 852 in fluid communication between the left control valve 850 and the left hydraulic cylinder 700. The control system 800 further includes a right supply line 862 in fluid communication between the right control valve 860 and the right hydraulic cylinder 750. While one line of fluid communication is described to each of the hydraulic cylinders, it is understood that some types of hydraulic cylinders are configured with bi-directional operation characteristics that require two separate supply lines for providing fluid to act on opposite sides of pistons in the hydraulic cylinders. If require, a bi-directional configuration could be implemented in a similar manner as previously described.

With further reference to FIG. 25, the controller 830 of the control system 800 may be provided with a means for sensing orientation of the tub 200. While a large variety of mechanism exist for sensing orientation, one mechanism is an accelerometer 832 capable of providing side-to-side angle of the tub 200 (gravitational force of earth, e.g. plumb/true). The accelerometer 832 may be configured with other sensors such as an angle-of-inclination of the tub 200 that reports back the current angle of the tub 200. While less likely to be utilized, the accelerometer 832 may be configured with a third-axis of reported angle which is referred to herein as a directional reading. The controller 830 is further provided with an electrical supply line 834 to transfer power to the hydraulic pump 810. The electrical supply line 834 is capable of transferring power sourced from the tractor unit 12 to the hydraulic pump 810 when there is a need for increasing pressure of the fluid. Additionally, the controller 830 is provided with a power lead 836 capable of sourcing the power from an on-trailer power supply (e.g. a battery or a generator) or directly from the tractor unit 12. Briefly summarized, during normal operation, power is delivered from the tractor unit 12 via the cable assembly 110 through the power lead 836 through the controller 830 and to the hydraulic pump 810 via the electrical supply line 834. Fluid is pressurized by the hydraulic pump 810 and transferred to the accumulator 820 via the pump-to-accumulator line 842 where it further travels to the left hydraulic cylinder 700 via the left supply line 852, the left control valve 850, and the accumulator-to-left-valve line 844. In a similar manner, the fluid travels to the right hydraulic cylinder 750 via the right supply line 862, the right control valve 860, and the accumulator-to-right-valve line 846. In some situations, the operation of the left hydraulic cylinder 700 and the right hydraulic cylinder 750 are synchronized (wherein the displacement and speed are matched). In other situations, the operation of the left hydraulic cylinder 700 and the right hydraulic cylinder 750 are independent (e.g. when loose-fill ground is located at a site and the accelerometer 832 senses and reports an angle-change to the controller 830).

With continued reference to FIG. 25, the draft arm assembly 600 is attached to the tub 200 as illustrated by a pivot rod 602 capturing the distal tube 642 of the distal hinge 640 (both FIG. 19). This capturing enables the draft arm assembly 600 to be rotatingly attached to the tub 200 about the center axis 270 (FIG. 6) because the draft arm distal axis 644 (FIGS. 19 and 20) is coaxial to the center axis 270. This positions the draft arm assembly 600 between the center-right hinge 274 and the center-left hinge 272 (both FIG. 6).

Figure 26:
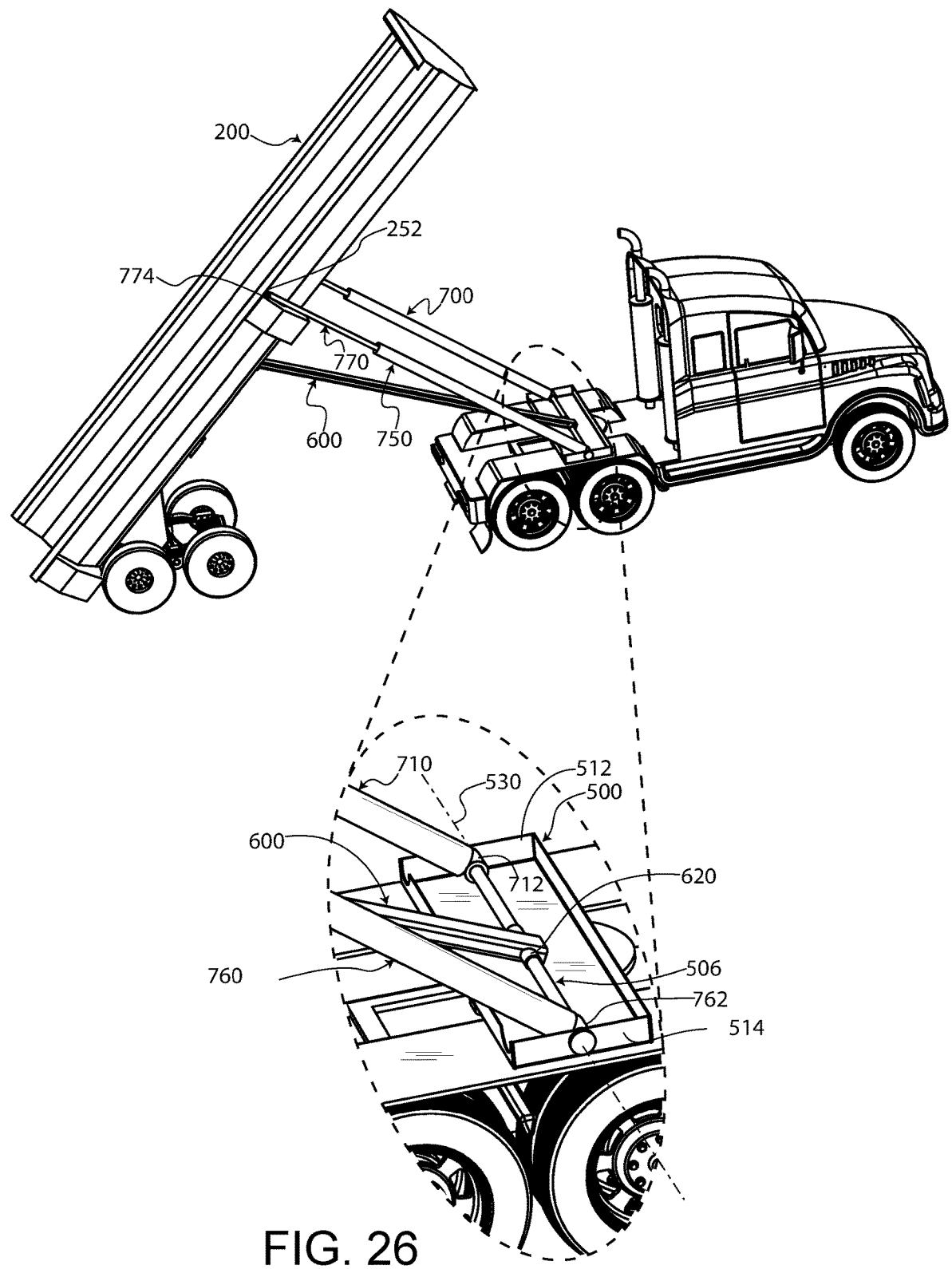
FIG. 26 is a side perspective view of a semi-trailer truck.

With reference to FIG. 26 showing a side perspective view of the semi-trailer truck 10, the draft arm assembly 600 is attached to the coupling plate 500 by a control pin 506 as illustrated. This attachment results in the proximal end 620 of the draft arm assembly 600 being attached to the coupling plate 500 between the left side 512 and the right side 514 of the coupling plate 500. The control pin 506 passes through the left hole 520 (FIG. 17) and the right hole 522 (FIG. 17) to create a hinge coaxial to the coupling axis 530 about which the draft arm assembly 600 is rotationally attached via the proximal hinge 630 (of the draft arm assembly 600). This places the draft arm proximal axis 634 (FIG. 20) coaxial to the coupling axis 530. It is important to note that in the transportation condition best illustrated in FIG. 2, the draft arm assembly 600 is positioned to be slightly non-parallel to the ground 20. With reference to FIG. 2, the draft arm assembly 600 intersects a ground plane of the ground 20 at draft arm angle 604 that is configured to always cause the linkage of the draft arm assembly 600 to move the closed end 206 of the tub 200 away from the ground 20. If the draft arm angle 604 was zero or slightly negative, the tub 200 would rotate towards ground 20 and therefore be inoperable. Therefore, the draft arm distal axis 644 (which is also coaxial to the center axis 270) is slightly 'above' the draft arm proximal axis 634 (which is also coaxial to the coupling axis 530) because any other orientation that places the draft arm distal axis 644 at the same level or slightly below the draft arm proximal axis 634 would bind the mechanism and it wouldn't function as intended. In other words, the draft arm 604 is non-parallel to the ground (and/or a plane defined by the coupling plate).

With reference again to FIG. 26, the hole 716 formed in the cap end head 712 of the body 710 on the left hydraulic cylinder 700 is captured by the control pin 506. This results in the left hydraulic cylinder 700 being rotatingly coupled to the coupling plate 500 about the coupling axis 530 (and the coaxial proximal hinge axis 702, FIG. 22). The draft arm assembly 600 may, typically, be oriented at the midpoint of the control pin 506 while the left hydraulic cylinder 700 is oriented by the left side 512 of the coupling plate 500. As further illustrated in FIG. 26, the hole 766 (FIG. 24) formed in the cap end head 762 of the body 760 on the right hydraulic cylinder 750 is captured by the control pin 506. This results in the right hydraulic cylinder 750 being rotatingly coupled to the coupling plate 500 about the coupling axis 530 (and the coaxial proximal hinge axis 752, FIG. 24). The draft arm assembly 600 may, typically, be oriented at the midpoint of the control pin 506 while the right hydraulic cylinder 750 is oriented by the right side 514 of the coupling plate 500. The hole 776 (FIG. 24) formed on the attachment hinge 774 positioned on the piston rod 770 of the right hydraulic cylinder 750 is adjacent to and coaxial with the right hinge 252 formed on the tub 200. This place the distal hinge axis 754 (FIG. 24) coaxial with the hinge axis 260 (FIG. 6) whereby the right hydraulic cylinder 750 is rotatingly attached to the tub 200.

Figure 27:
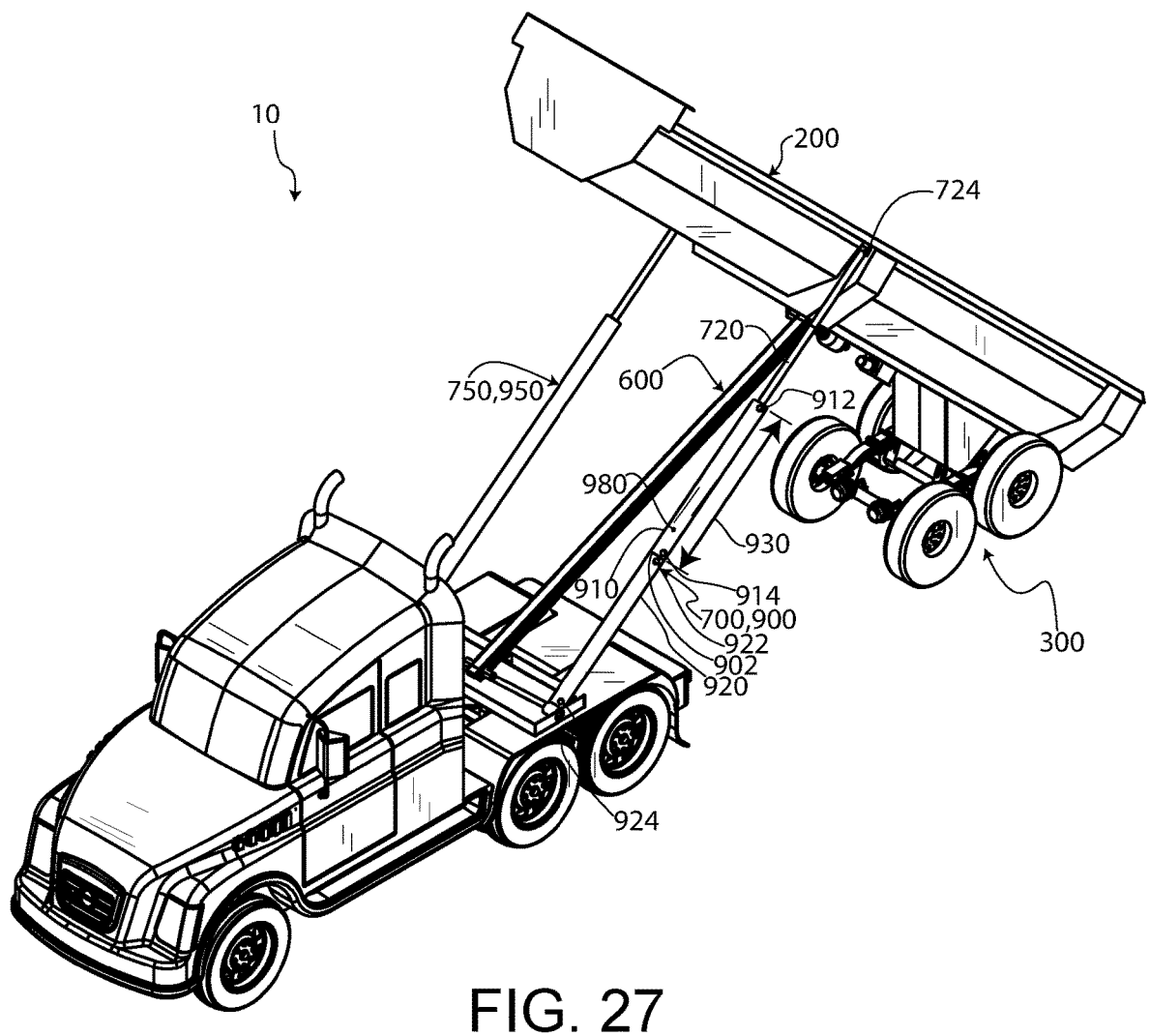
FIG. 27 is a front left side perspective view of the semi-trailer truck.

With reference to FIG. 27 showing a front left side perspective view of the semi-trailer truck 10, the left hydraulic cylinder 700 is rotatingly attached to the tub 200 via the hole 726 formed on the attachment hinge 724 positioned on the piston rod 720 of the left hydraulic cylinder 700. This orientation results in the left hinge 250 formed on the tub 200 being adjacent to and coaxial with the hole 726. This place the distal hinge axis 704 (FIG. 22) coaxial with the hinge axis 260 (FIG. 6) whereby the left hydraulic cylinder 700 is rotatingly attached to the tub 200.

Figure 28:
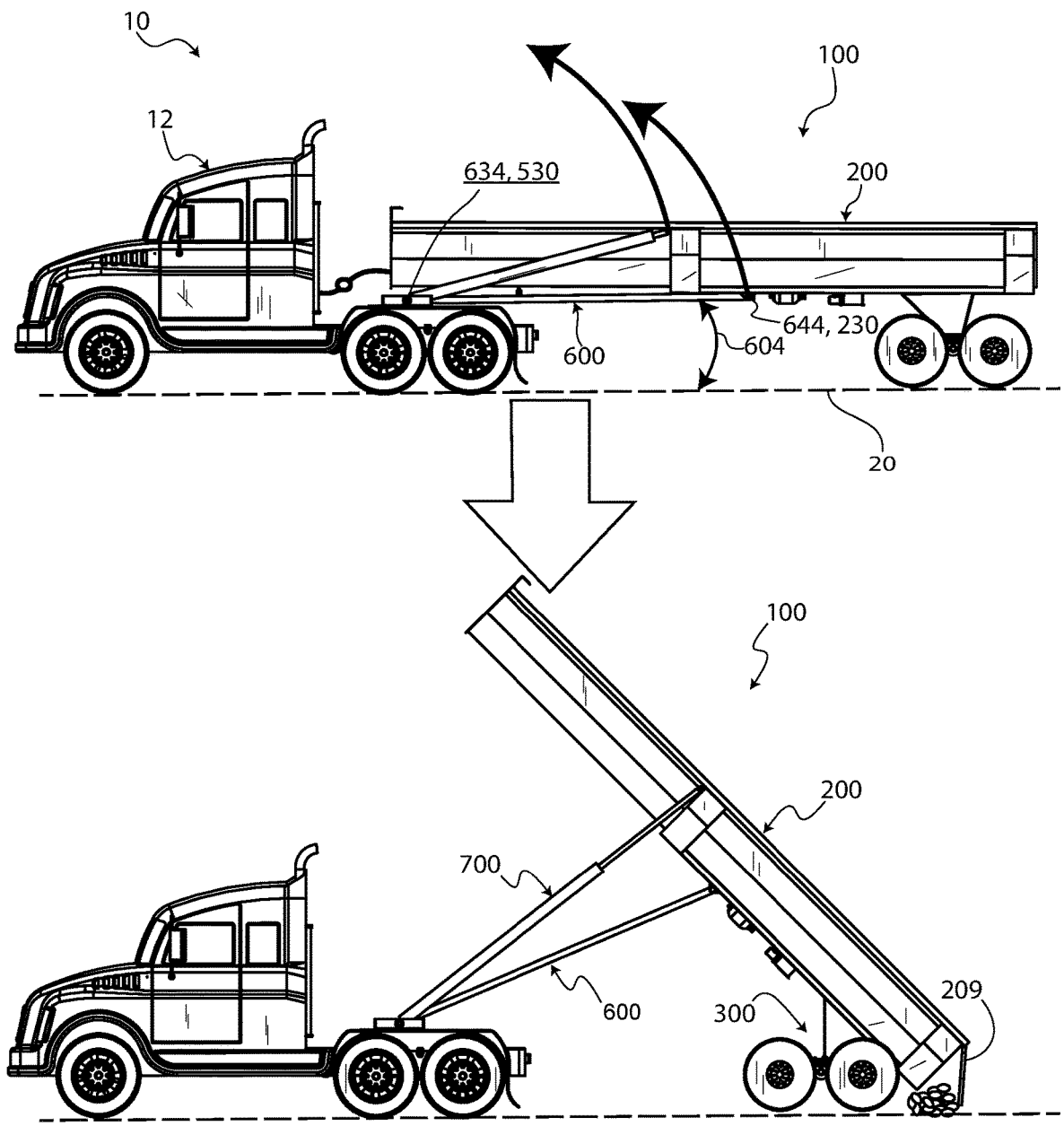
FIG. 28 is a side elevation view of the semi-trailer truck.

With reference to FIG. 28 showing a side elevation view of the semi-trailer truck 10 with the movement from the transporting condition to the dumping condition, the control system 800 implements a process for controlling expansion of the left hydraulic cylinder 700 and the right hydraulic cylinder 750 to cause the closed end 206 of the tub 200 to move away from ground 20 in a controlled and improved manner. To enable this controlled expansion, the control system 800 senses any subpar conditions that may lead to a rollover condition and/or a probability of a rollover event. In response to sensing, the control system 800 may be preprogrammed to take any of a number of actions such as, for example: moving the semi-trailer truck 10 forward or backwards; slowly lowering either or both of the left hydraulic cylinder 700 and right hydraulic cylinder 750; quickly lowering either or both of the left hydraulic cylinder 700 and right hydraulic cylinder 750; slowly raising either or both of the left hydraulic cylinder 700 and right hydraulic cylinder 750; quickly raising either or both of the left hydraulic cylinder 700 and right hydraulic cylinder 750; or other actions implied and feasibly but not specifically described herein. If the left hydraulic cylinder 700 is operated separately from the right hydraulic cylinder 750, the tub 200 is shifted to cause asymmetrical movement of the left spring assembly 350 and right spring assembly 390 of the rear assembly 300 (all shown in FIG. 8) to cause changes of the left deflection distance 380 and left deflection distance 420 (both shown in FIG. 16).

By operating the left hydraulic cylinder 700 and right hydraulic cylinder 750 independently, the control system 800 can greatly improve the safety and therefore speed of the dumping condition. In accomplishing this, the system improves the speed of movement of load(s) from a first location to a second location (where the dumping event occurs).

In one alternative configuration, the dump trailer 100 may be provided with linear measurement equipment on the on left hydraulic cylinder 700 and/or the right hydraulic cylinder 750. Examples of linear measurement equipment include, for example: laser, friction wheel, linear encoder, etc. This measurement equipment may provide a feedback loop to the control system 800 for ensuring that the system is properly operating as intended and nothing is malfunctioning (due to normal wear, adverse operation, and/or improper use of the dump trailer 100).

In one alternative configuration, the accelerometer 832 can be on a main circuit board of the controller 830. Alternatively, the accelerometer 832 may be mounted at a different location and in communication with the control system 800 either wired or wirelessly. Furthermore, the accelerometer 832 may be similar to Freescale's MMA8452Q which is low-power, three-axis, capacitive micro-machined accelerometer with 12 bits of resolution. The accelerometer 832 is able to sense orientation or motion and to report it back to a microcontroller (for example) via a standard communication protocol (e.g. I2C, SPI).

In one alternative configuration, a mobile device and/or an application running on a device can track the efficacy of the dumping event. This application can measure, track and ranking the safety record of the site, the truck, the operator of the truck individually and statistically. The application can report this safety record to at least one of the following to a regulatory body, a truck owner, and/or an insurance company. The dump trailer 100 may include a control system with an application based interface such as a mobile device (e.g. cellphone, tablet, portable media player, radio deck with interface features, etc). In this alternative configuration, the phone provides metrics about the quality-of-safety for the transportation process (including, for example, the loading and unloading processes). The device that the application is running on may include a spectrum chip operable with the control system for communicating under various protocols (e.g. Bluetooth, WiFi, cellular, 5G, 4G, CDMA, GSM, etc) to external machines (e.g. portable devices, signals, servers, the internet, etc.).

In one alternative configuration, the rear assembly 300 may be configured with a single axle having at least a pair of left and right wheels. The springs can be coil-over springs or special tires capable of deflecting may be utilized in replacement of the more complex configuration of FIG. 8.

In one alternative configuration, the left wall, right wall and web of the tub 200 can be formed from out of single sheet of material (either folded and welded, pieced together, or slip-rolled if a circumferential profile).

In one alternative configuration, the control system 800 may be positioned inside the pyramid 430 where it is protected from debris and impact.

In one alternative configuration, the rear assembly 300 may be configured with a single axle having at least a pair of wheels and air springs that replace the more complex spring assembly.

In one alternative configuration illustrated in FIG. 27, a left cylinder 900 may be configured to act as a double-acting cylinder but modified so that one region is a reservoir for storing and dispensing hydraulic fluid. As best illustrated in FIG. 27, the left cylinder 900 includes a partition 902, a working end 910, a first port 912, a second port 914, a reservoir end 920, a third port 922, a fourth port 924 and a working distance 930. The partition 902 separates the working end 910 from the reservoir end 920; for example, a traditional long hydraulic cylinder could be modified with a baffle inserted and sealingly engaged to the interior portion of the left cylinder 900. In this configuration, the first port 912 and the second port 914 are in fluid communication with the working end 910 for moving the rod relative to the bore.

To extend the rod from the bore (thereby expanding the left cylinder 900), hydraulic fluid is introduced to the second port 914 and to shorten the left cylinder 900, hydraulic fluid is removed from the second port 914 and hydraulic fluid is moved into the first port 912. This alternative configuration has the reservoir end 920 where hydraulic fluid can be stored. Either air or hydraulic fluid can be added or removed via the third port 922 and the fourth port 924. One particular feature of this configuration is that the fourth port 924 is generally the lowest part of the configuration so hydraulic fluid is readily sourced from the fourth port 924. It should be understood by those skilled in the art that various components of the control system 800 may be in fluid communication with the left cylinder 900 via one or more of the first port 912, the second port 914, the third port 922 and the fourth port 924. It should be further understood that the teachings of the left cylinder 900 may be present in a right cylinder 950, but details thereof are not described herein. It is to be understood that the left cylinder 900 and the right cylinder could also be configured as a single-acting cylinder (e.g. the second port 914 may simply be open to air or outright deleted).

In one alternative configuration, the left cylinder 900 may be provided with pressure sensors (e.g. left pressure sensor 980) configured to measure pressure of the hydraulic fluid. In this configuration, the pressure sensors may be attached to each of the hydraulic cylinders and interfaced with a control system where the pressures can be compared. If a threshold (either predetermined, spot-determined, adapted, or otherwise indicated) between the left cylinder pressure and the right cylinder pressure is exceeded, the system may be halted (e.g. stopped) and/or the tub may be lowered until the excessive difference of pressure is reduced or eliminated. It should be noted that the pressure may be monitored anywhere that is in fluid communication, for example there may be a manifold from which the various hydraulic lines are connected and therefore the left pressure sensor 980 may be attached to a manifold (not shown) and generally interfaced with the control system 800.

While the above description includes terms such as top, bottom, left, right, inside, outside, front, back, and other descriptors regarding physical orientation and/or position, it is to be understood that these are provided for illustrative purposes only. However, the present description was provided to convey to one skilled in the art.

As used herein, the terms symmetrical, symmetrically, symmetrically disposed and variants similar to these is to be construed as generally a mirror copy about a central plane.

While the principles of the disclosure have been described above in connection with the specific apparatuses and methods, it is to be understood that this description is made only by way of example and not as limitation on the scope of the disclosure.

Various Notes and Examples

Example 1 is a dump trailer for a semi-trailer truck comprising: a tub, defining an exterior portion, comprising: a web; a left wall adjoining the web; a right wall adjoining the web and symmetrical to the left wall; a closed end adjoining the web, left wall, and right wall; an open end oppositely disposed from the closed end and adjoining the web, left wall, and right wall; a hinge axis parallel to and offset from the web; a left hinge formed on the exterior portion of the left wall and coaxial with the hinge axis; a right hinge formed on the exterior portion of the right wall and coaxial with the hinge axis; a distal draft arm axis parallel and adjacent to the web, the distal draft arm axis formed on the exterior portion of the web; and a center hinge formed on the web and coaxial with the distal draft arm axis, the center hinge symmetrically disposed between the left wall and the right wall; a coupling plate to engage the dump trailer to the semi-trailer truck, comprising: a hydraulic cylinder axis formed on the coupling plate; a left hydraulic cylinder hinge formed on the coupling plate and coaxial with the hydraulic cylinder axis; a right hydraulic cylinder hinge formed on the coupling plate and coaxial with the hydraulic cylinder axis; a proximal draft arm axis formed on the coupling plate; and a draft arm hinge formed on the coupling plate and coaxial with the draft arm axis, the draft arm hinge symmetrically disposed between the left hydraulic cylinder hinge and the left hydraulic cylinder hinge; a draft arm symmetrically disposed between the left wall and the right wall of the tub, the draft arm comprising: a proximal end attached to the draft arm hinge of the coupling plate and rotationally attached to the coupling plate about the proximal draft arm axis; and a distal end oppositely disposed from the proximal end, attached to the center hinge of the tub, and rotationally attached to the tub about the distal draft arm axis; a left hydraulic cylinder defining a left cylinder length, the left hydraulic cylinder comprising: a proximal end attached to the left hydraulic cylinder hinge; a distal end oppositely disposed from the proximal end and attached to the left hinge on the tub; and wherein addition of a first amount of fluid changes the left cylinder length; a right hydraulic cylinder defining a right cylinder length, the right hydraulic cylinder comprising: a proximal end attached to the right hydraulic cylinder hinge; a distal end oppositely disposed from the proximal end and attached to the right hinge on the tub; and wherein addition of a second amount of fluid changes the right cylinder length; a rear assembly pivotally attached to the tub at the web adjacent to the open end, the rear assembly comprising: a first pair of wheels; and a rear pivot around which the tub rotates; whereby increase in both left cylinder length and right cylinder length cause: the distal end of the draft arm to move away from earth; and the tub to rotate about the rear pivot.

In Example 2, the subject matter of Example 1 optionally includes and further comprising: a coupling plane that is parallel to the coupling plate; a draft arm plane that is coplanar to the draft arm, wherein the proximal draft arm axis and distal draft arm axis reside in the draft arm plane; and wherein the coupling plane and the draft arm plane are non-parallel.

In Example 3, the subject matter of any one or more of Examples 1-2 optionally include wherein: the left hydraulic cylinder comprises: a left bore cylinder at the proximal end, the left bore cylinder attached to the left hydraulic cylinder hinge; a left rod slidingly coupled to the left bore cylinder, the left rod attached to the left hinge on the tub; and wherein addition of the first amount of fluid ejects the left rod from the left bore cylinder; the right hydraulic cylinder comprises: a right bore cylinder at the proximal end, the right bore cylinder attached to the right hydraulic cylinder hinge; a right rod slidingly coupled to the right bore cylinder, the right rod attached to the right hinge on the tub; and wherein addition of the second amount of fluid ejects the right rod from the right bore cylinder.

In Example 4, the subject matter of any one or more of Examples 1-3 optionally include wherein the hydraulic cylinder axis and the proximal draft arm axis are coaxial.

In Example 5, the subject matter of any one or more of Examples 1-4 optionally include wherein the hinge axis is formed through the left wall and the right wall.

In Example 6, the subject matter of Example 5 optionally includes and further comprising: a topside formed on the tub; wherein the left hydraulic cylinder hinge is formed on the left wall adjoining the topside of the tub; and wherein the right hydraulic cylinder hinge is formed on the right wall adjoining the topside of the tub.

In Example 7, the subject matter of any one or more of Examples 1-6 optionally include and further comprising: a hydraulic pump attached to the dump trailer; an accumulator in fluid communication with the hydraulic pump and attached to the dump trailer; a left hydraulic valve in fluid communication with the left hydraulic cylinder; a right hydraulic valve in fluid communication with the right hydraulic cylinder; a controller in communication with the left hydraulic valve and the right hydraulic valve; an electric power supply line in electrical communication with semi-trailer truck and the hydraulic pump; whereby power from semi-trailer truck is transferred to the hydraulic pump for pressurizing an amount of hydraulic fluid; whereby at least a portion of the hydraulic fluid is transferred to the right hydraulic cylinder via the right hydraulic valve and the accumulator; and whereby at least a portion of the hydraulic fluid is transferred to the left hydraulic cylinder via the left hydraulic valve and the accumulator.

In Example 8, the subject matter of any one or more of Examples 1-7 optionally include and further comprising: a center plane formed on the tub, wherein the center plane is symmetrically located between the left wall and the right wall; a chassis plane formed on semi-trailer truck, wherein the chassis plane is defined by at least two axles of the semi-trailer truck that are coplanar to the chassis plane; a perpendicular condition wherein: the center plane of the tub is perpendicular to the chassis plane; and the left cylinder length and the right cylinder length are equal; a canted condition wherein: the center plane is non-perpendicular to the chassis plane; and the right cylinder length and the right cylinder length are different.

In Example 9, the subject matter of any one or more of Examples 1-8 optionally include wherein the rear assembly further comprises: a second pair of wheels parallel to the first pair of wheels; a spring assembly comprising: at least one leaf spring comprising first end and a second end; a first axle attachment on the first end; a second axle attachment on the second end; and a hinge symmetrically attached between the first end and the second end of the leaf spring; wherein the first pair of wheels are attached to the first axle attachment with a first axle; wherein the second pair of wheels are attached to the second axle attachment with a second axle; and wherein the rear pivot about which the tub rotates is coaxial with a hinge assembly.

Example 10 is a method of controlling unloading of a dump trailer comprising: providing a tub, defining an exterior portion, comprising: a web; a left wall adjoining the web; a right wall adjoining the web and symmetrical to the left wall; a closed end adjoining the web, left wall, and right wall; an open end: oppositely disposed from the closed end; and, adjoining the web, left wall, and right wall; a hinge axis formed through the left wall and the right wall; a left hinge formed on the exterior portion of the left wall and coaxial with the hinge axis; a right hinge formed on the exterior portion of the right wall and coaxial with the hinge axis; a distal draft arm axis adjacent to the web and on the exterior portion of the web; a center hinge formed on the web and coaxial with the distal draft arm axis; and a center plane symmetrically disposed between the left wall and the right wall; providing a coupling plate, configured to engage the dump trailer to semi-trailer truck, comprising: a hydraulic cylinder axis formed on the coupling plate; a left hydraulic cylinder hinge: formed on the coupling plate; and coaxial with the hydraulic cylinder axis; a right hydraulic cylinder hinge: formed on the coupling plate; and coaxial with the hydraulic cylinder axis; a proximal draft arm axis formed on the coupling plate; and a draft arm hinge: formed on the coupling plate; and coaxial with the draft arm axis; providing a draft arm, symmetrically disposed between the left wall and the right wall of the tub, comprising: a proximal end rotationally attached to the coupling plate about the proximal draft arm axis; and a distal end: oppositely disposed from the proximal end; attached to the center hinge; and whereby the draft arm is rotationally attached to the tub about the distal draft arm axis; providing a left hydraulic cylinder, defining a left cylinder length, comprising: a proximal end attached to the left hydraulic cylinder hinge; a distal end oppositely disposed from the proximal end and attached to the left hinge on the tub; and wherein addition of a first amount of fluid changes the left cylinder length; providing a right hydraulic cylinder, defining a right cylinder length, comprising: a proximal end attached to the right hydraulic cylinder hinge; a distal end oppositely disposed from the proximal end and attached to the right hinge on the tub; and wherein addition of a second amount of fluid changes the right cylinder length; providing a rear assembly attached to the tub adjoining the web and adjacent to the open end, the rear assembly comprising: a first pair of wheels; and a rear pivot about which the tub rotates; a second pair of wheels parallel to the first pair of wheels; a spring assembly comprising: at least one leaf spring comprising first end and a second end; a first axle attachment on the first end; a second axle attachment on the second end; and a hinge symmetrically attached between the first end and the second end of the leaf spring; wherein the first pair of wheels are attached to the first axle attachment with a first axle; wherein the second pair of wheel are attached to the second axle attachment with a second axle; and wherein the rear pivot about which the tub rotates is coaxial with the hinge of the rear assembly; increasing in both the left cylinder length and the right cylinder length: moves the distal end of the draft arm to away from earth; and rotates the tub about the rear pivot; monitoring perpendicularity of the center plane; increasing either the left cylinder length or the right cylinder length to compress the leaf spring in the spring assembly; and thereby controlling the unloading of the dump trailer.

In Example 11, the subject matter of Example 10 optionally includes and further comprising: providing: a hydraulic pump attached to the dump trailer; an accumulator in fluid communication with the hydraulic pump and attached to the dump trailer; a left hydraulic valve in fluid communication with the left hydraulic cylinder; a right hydraulic valve in fluid communication with the right hydraulic cylinder; a controller in communication with the left hydraulic valve and the right hydraulic valve; an electric power supply line in electrical communication with semi-trailer truck and the hydraulic pump; transferring power from semi-trailer truck to the hydraulic pump; pressurizing an amount of hydraulic fluid with the hydraulic pump; whereby during the monitoring perpendicularity, the controller independently controls the left hydraulic valve and the right hydraulic valve; and thereby controlling unloading of the dump trailer.

Example 12 is a dump trailer for a semi-trailer truck comprising: a chassis plane formed on semi-trailer truck, wherein the chassis plane is defined by at least two axles of the semi-trailer truck that are coplanar to the chassis plane; a tub, comprising: a web; a left side adjoining the web; a right side adjoining the web; and a center plane formed on the tub, wherein the center plane is symmetrically located between the left wall and the right wall; a draft arm symmetrically disposed between the left side and the right side of the tub, the draft arm comprising: a proximal end; and a distal end oppositely disposed from the proximal end, rotationally attached to the web of the tub; a coupling plate to engage the dump trailer to the semi-trailer truck, wherein: the proximal end of the draft arm is rotationally attached to the coupling plate; a left hydraulic cylinder defining a left cylinder length, the left hydraulic cylinder comprising: a proximal end rotationally attached to the coupling plate; and a distal end oppositely disposed from the proximal end and rotationally attached to the tub; a right hydraulic cylinder defining a right cylinder length, the right hydraulic cylinder comprising: a proximal end rotationally attached to the coupling plate; and a distal end oppositely disposed from the proximal end and rotationally attached to the tub; a rear assembly pivotally attached to the tub at the web, the rear assembly comprising: a first pair of wheels; and a rear pivot around which the tub rotates; a perpendicular condition wherein: the center plane of the tub is perpendicular to the chassis plane; and the left cylinder length and the right cylinder length are equal; a canted condition wherein: the center plane is non-perpendicular to the chassis plane; and the right cylinder length and the right cylinder length are different.

In Example 13, the subject matter of Example 12 optionally includes wherein the draft arm and the coupling plane are non-parallel.

In Example 14, the subject matter of any one or more of Examples 12-13 optionally include wherein: the left hydraulic cylinder comprises: a left bore cylinder rotationally attached to coupling plate; and a left rod slidingly coupled to the left bore cylinder, the left rod rotationally attached to the left side of the tub; the right hydraulic cylinder comprises: a right bore cylinder rotationally attached to the coupling plate; and a right rod slidingly coupled to the right bore cylinder, the right rod rotationally attached to the right side on the tub.

In Example 15, the subject matter of Example 14 optionally includes and further comprising: a topside formed on the tub; wherein the left rod of the left hydraulic cylinder is adjoining the topside of the tub; and wherein the right rod of the right hydraulic cylinder is adjoining the topside of the tub.

In Example 16, the subject matter of any one or more of Examples 12-15 optionally include wherein the left hydraulic cylinder, the right hydraulic cylinder; and the proximal end of the draft arm are rotationally attached to the coupling plate along a common axis of rotation.

In Example 17, the subject matter of any one or more of Examples 12-16 optionally include and further comprising: a hydraulic pump attached to the dump trailer; an accumulator in fluid communication with the hydraulic pump and attached to the dump trailer; a left hydraulic valve in fluid communication with the left hydraulic cylinder; a right hydraulic valve in fluid communication with the right hydraulic cylinder; a controller in communication with the left hydraulic valve and the right hydraulic valve; an electric power supply line in electrical communication with semi-trailer truck and the hydraulic pump; whereby power from semi-trailer truck is transferred to the hydraulic pump for pressurizing an amount of hydraulic fluid; whereby at least a portion of the hydraulic fluid is transferred to the right hydraulic cylinder via the right hydraulic valve and the accumulator; and whereby at least a portion of the hydraulic fluid is transferred to the left hydraulic cylinder via the left hydraulic valve and the accumulator.

In Example 18, the subject matter of Example 17 optionally includes and further comprising: an accelerometer attached to the dump trailer configured to sense orientation of the center plane; wherein the accelerometer is in communication with the controller; and a set of instructions implemented by the controller to change the right cylinder length and the left cylinder length.

In Example 19, the subject matter of Example 18 optionally includes wherein the accelerometer is attached to the web of the tub.

What is claimed is:
1. A dump trailer for a semi-trailer truck comprising:
  a tub, defining an exterior portion, comprising:
    a web;
    a left wall adjoining the web;
    a right wall adjoining the web and symmetrical to the left wall;
    a closed end adjoining the web, the left wall, and the right wall;
    an open end oppositely disposed from the closed end and adjoining the web, the left wall, and the right wall;
    a hinge axis parallel to and offset from the web;
    a left hinge formed on the exterior portion of the left wall and coaxial with the hinge axis;
    a right hinge formed on the exterior portion of the right wall and coaxial with the hinge axis;
    a distal draft arm axis parallel and adjacent to the web, the distal draft arm axis formed on the exterior portion of the web; and
    a center hinge formed on the web and coaxial with the distal draft arm axis, the center hinge symmetrically disposed between the left wall and the right wall;
  a coupling plate to engage the dump trailer to the semi-trailer truck, comprising:
    a hydraulic cylinder axis formed on the coupling plate;
    a left hydraulic cylinder hinge formed on the coupling plate and coaxial with the hydraulic cylinder axis;
    a right hydraulic cylinder hinge formed on the coupling plate and coaxial with the hydraulic cylinder axis;
    a proximal draft arm axis formed on the coupling plate; and
    a draft arm hinge formed on the coupling plate and coaxial with the draft arm axis, the draft arm hinge symmetrically disposed between the left hydraulic cylinder hinge and the left hydraulic cylinder hinge;
  a draft arm symmetrically disposed between the left wall and the right wall of the tub, the draft arm comprising:
    a proximal end attached to the draft arm hinge of the coupling plate and rotationally attached to the coupling plate about the proximal draft arm axis; and
    a distal end oppositely disposed from the proximal end, attached to the center hinge of the tub, and rotationally attached to the tub about the distal draft arm axis;
  a left hydraulic cylinder defining a left cylinder length, the left hydraulic cylinder comprising:
    a proximal end attached to the left hydraulic cylinder hinge;
    a distal end oppositely disposed from the proximal end and attached to the left hinge on the tub; and
    wherein addition of a first amount of fluid changes the left cylinder length;
  a right hydraulic cylinder defining a right cylinder length, the right hydraulic cylinder comprising:

a proximal end attached to the right hydraulic cylinder hinge;
a distal end oppositely disposed from the proximal end and attached to the right hinge on the tub; and
wherein addition of a second amount of fluid changes the right cylinder length;
a rear assembly pivotally attached to the tub at the web adjacent to the open end, the rear assembly comprising:
a first pair of wheels; and
a rear pivot around which the tub rotates;
whereby increase in both the left cylinder length and the right cylinder length cause:
the distal end of the draft arm to move away from earth; and
the tub to rotate about the rear pivot.

2. The dump trailer of claim 1 and further comprising:
a coupling plane that is parallel to the coupling plate;
a draft arm plane that is coplanar to the draft arm, wherein the proximal draft arm axis and the distal draft arm axis reside in the draft arm plane; and
wherein the coupling plane and the draft arm plane are non-parallel.

3. The dump trailer of claim 1 wherein:
the left hydraulic cylinder comprises:
a left bore cylinder at the proximal end, the left bore cylinder attached to the left hydraulic cylinder hinge;
a left rod slidingly coupled to the left bore cylinder, the left rod attached to the left hinge on the tub; and
wherein addition of the first amount of fluid ejects the left rod from the left bore cylinder;
the right hydraulic cylinder comprises:
a right bore cylinder at the proximal end, the right bore cylinder attached to the right hydraulic cylinder hinge;
a right rod slidingly coupled to the right bore cylinder, the right rod attached to the right hinge on the tub; and
wherein addition of the second amount of fluid ejects the right rod from the right bore cylinder.

4. The dump trailer of claim 1 wherein the hydraulic cylinder axis and the proximal draft arm axis are coaxial.

5. The dump trailer of claim 1 wherein the hinge axis is formed through the left wall and the right wall.

6. The dump trailer of claim 5 and further comprising:
a topside formed on the tub;
wherein the left hydraulic cylinder hinge is formed on the left wall adjoining the topside of the tub; and
wherein the right hydraulic cylinder hinge is formed on the right wall adjoining the topside of the tub.

7. The dump trailer of claim 1 and further comprising:
a hydraulic pump attached to the dump trailer;
an accumulator in fluid communication with the hydraulic pump and attached to the dump trailer;
a left hydraulic valve in fluid communication with the left hydraulic cylinder;
a right hydraulic valve in fluid communication with the right hydraulic cylinder;
a controller in communication with the left hydraulic valve and the right hydraulic valve;
an electric power supply line in electrical communication with semi-trailer truck and the hydraulic pump;
whereby power from semi-trailer truck is transferred to the hydraulic pump operable to pressurize an amount of hydraulic fluid;
whereby at least a portion of the fluid is transferred to the right hydraulic cylinder via the right hydraulic valve and the accumulator; and
whereby at least a portion of the fluid is transferred to the left hydraulic cylinder via the left hydraulic valve and the accumulator.

8. The dump trailer of claim 1 and further comprising:
a center plane formed on the tub, wherein the center plane is symmetrically located between the left wall and the right wall;
a chassis plane formed on semi-trailer truck, wherein the chassis plane is defined by at least two axles of the semi-trailer truck that are coplanar to the chassis plane;
a perpendicular condition wherein:
the center plane of the tub is perpendicular to the chassis plane; and
the left cylinder length and the right cylinder length are equal;
a canted condition wherein:
the center plane is non-perpendicular to the chassis plane; and
the right cylinder length and the left cylinder length are different.

9. The dump trailer of claim 1 wherein the rear assembly further comprises:
a second pair of wheels parallel to the first pair of wheels;
a spring assembly comprising:
at least one leaf spring comprising first end and a second end;
a first axle attachment on the first end;
a second axle attachment on the second end; and
a hinge symmetrically attached between the first end and the second end of the leaf spring;
wherein the first pair of wheels are attached to the first axle attachment with a first axle;
wherein the second pair of wheels are attached to the second axle attachment with a second axle; and
wherein the rear pivot about which the tub rotates is coaxial with a hinge assembly.

10. A method of controlling unloading of a dump trailer comprising:
providing a tub, defining an exterior portion, comprising:
a web;
a left wall adjoining the web;
a right wall adjoining the web and symmetrical to the left wall;
a closed end adjoining the web, left wall, and right wall;
an open end: oppositely disposed from the closed end; and, adjoining the web, the left wall, and the right wall;
a hinge axis formed through the left wall and the right wall;
a left hinge formed on the exterior portion of the left wall and coaxial with the hinge axis;
a right hinge formed on the exterior portion of the right wall and coaxial with the hinge axis;
a distal draft arm axis adjacent to the web and on the exterior portion of the web;
a center hinge formed on the web and coaxial with the distal draft arm axis; and
a center plane symmetrically disposed between the left wall and the right wall;
providing a coupling plate, configured to engage the dump trailer to semi-trailer truck, comprising:
a hydraulic cylinder axis formed on the coupling plate;
a left hydraulic cylinder hinge: formed on the coupling plate; and coaxial with the hydraulic cylinder axis;
a right hydraulic cylinder hinge: formed on the coupling plate; and coaxial with the hydraulic cylinder axis;

a proximal draft arm axis formed on the coupling plate; and
a draft arm hinge: formed on the coupling plate; and coaxial with the draft arm axis;
providing a draft arm, symmetrically disposed between the left wall and the right wall of the tub, comprising:
a proximal end rotationally attached to the coupling plate about the proximal draft arm axis; and
a distal end: oppositely disposed from the proximal end; attached to the center hinge; and whereby the draft arm is rotationally attached to the tub about the distal draft arm axis;
providing a left hydraulic cylinder, defining a left cylinder length, comprising:
a proximal end attached to the left hydraulic cylinder hinge;
a distal end oppositely disposed from the proximal end and attached to the left hinge on the tub; and
wherein addition of a first amount of fluid changes the left cylinder length;
providing a right hydraulic cylinder, defining a right cylinder length, comprising:
a proximal end attached to the right hydraulic cylinder hinge;
a distal end oppositely disposed from the proximal end and attached to the right hinge on the tub; and
wherein addition of a second amount of fluid changes the right cylinder length;
providing a rear assembly attached to the tub adjoining the web and adjacent to the open end, the rear assembly comprising:
a first pair of wheels; and
a rear pivot about which the tub rotates;
a second pair of wheels parallel to the first pair of wheels;
a spring assembly comprising:
at least one leaf spring comprising first end and a second end;
a first axle attachment on the first end;
a second axle attachment on the second end; and
a hinge symmetrically attached between the first end and the second end of the leaf spring;
wherein the first pair of wheels are attached to the first axle attachment with a first axle;
wherein the second pair of wheel are attached to the second axle attachment with a second axle; and
wherein the rear pivot about which the tub rotates is coaxial with the hinge of the rear assembly;
increasing in both the left cylinder length and the right cylinder length:
moves the distal end of the draft arm to away from earth; and
rotates the tub about the rear pivot;
monitoring perpendicularity of the center plane;
increasing either the left cylinder length or the right cylinder length to compress the leaf spring in the spring assembly; and
thereby controlling the unloading of the dump trailer.

11. The method of controlling unloading of the dump trailer of claim 10 and further comprising:
providing:
a hydraulic pump attached to the dump trailer;
an accumulator in fluid communication with the hydraulic pump and attached to the dump trailer;
a left hydraulic valve in fluid communication with the left hydraulic cylinder;
a right hydraulic valve in fluid communication with the right hydraulic cylinder;
a controller in communication with the left hydraulic valve and the right hydraulic valve;
an electric power supply line in electrical communication with semi-trailer truck and the hydraulic pump;
transferring power from semi-trailer truck to the hydraulic pump;
pressurizing an amount of hydraulic fluid with the hydraulic pump;
whereby during the monitoring perpendicularity, the controller independently controls the left hydraulic valve and the right hydraulic valve; and
thereby controlling unloading of the dump trailer.

12. A dump trailer for a semi-trailer truck comprising:
a chassis plane formed on the semi-trailer truck, wherein the chassis plane is defined by at least two axles of the semi-trailer truck that are coplanar to the chassis plane;
a tub, comprising:
a web;
a left side adjoining the web;
a right side adjoining the web; and
a center plane formed on the tub, wherein the center plane is symmetrically located between the left side and the right side;
a draft arm symmetrically disposed between the left side and the right side of the tub, the draft arm comprising:
a proximal end; and
a distal end oppositely disposed from the proximal end, rotationally attached to the web of the tub;
a coupling plate to engage the dump trailer to the semi-trailer truck, wherein:
the proximal end of the draft arm is rotationally attached to the coupling plate;
a left hydraulic cylinder defining a left cylinder length, the left hydraulic cylinder comprising:
a proximal end rotationally attached to the coupling plate; and
a distal end oppositely disposed from the proximal end and rotationally attached to the tub;
a right hydraulic cylinder defining a right cylinder length, the right hydraulic cylinder comprising:
a proximal end rotationally attached to the coupling plate; and
a distal end oppositely disposed from the proximal end and rotationally attached to the tub;
a rear assembly pivotally attached to the tub at the web, the rear assembly comprising:
a first pair of wheels; and
a rear pivot around which the tub rotates;
a perpendicular condition wherein:
the center plane of the tub is perpendicular to the chassis plane; and
the left cylinder length and the right cylinder length are equal;
a canted condition wherein:
the center plane is non-perpendicular to the chassis plane; and
the right cylinder length and the left cylinder length are different.

13. The dump trailer of claim 12 wherein the draft arm and the coupling plate are non-parallel.

14. The dump trailer of claim 12 wherein:
the left hydraulic cylinder comprises:
a left bore cylinder rotationally attached to coupling plate; and a left rod slidingly coupled to the left bore cylinder, the left rod rotationally attached to the left side of the tub;

the right hydraulic cylinder comprises:
- a right bore cylinder rotationally attached to the coupling plate; and
- a right rod slidingly coupled to the right bore cylinder, the right rod rotationally attached to the right side on the tub.

15. The dump trailer of claim 14 and further comprising:
a topside formed on the tub;
wherein the left rod of the left hydraulic cylinder is adjoining the topside of the tub; and
wherein the right rod of the right hydraulic cylinder is adjoining the topside of the tub.

16. The dump trailer of claim 12 wherein the left hydraulic cylinder, the right hydraulic cylinder; and the proximal end of the draft arm are rotationally attached to the coupling plate along a common axis of rotation.

17. The dump trailer of claim 12 and further comprising:
a hydraulic pump attached to the dump trailer;
an accumulator in fluid communication with the hydraulic pump and attached to the dump trailer;
a left hydraulic valve in fluid communication with the left hydraulic cylinder;
a right hydraulic valve in fluid communication with the right hydraulic cylinder;
a controller in communication with the left hydraulic valve and the right hydraulic valve;
an electric power supply line in electrical communication with semi-trailer truck and the hydraulic pump;
whereby power from semi-trailer truck is transferred to the hydraulic pump operable to pressurize an amount of hydraulic fluid;
whereby at least a portion of the fluid is transferred to the right hydraulic cylinder via the right hydraulic valve and the accumulator; and
whereby at least a portion of the fluid is transferred to the left hydraulic cylinder via the left hydraulic valve and the accumulator.

18. The dump trailer of claim 17 and further comprising:
an accelerometer attached to the dump trailer configured to sense orientation of the center plane;
wherein the accelerometer is in communication with the controller; and
a set of instructions implemented by the controller to change the right cylinder length and the left cylinder length.

19. The dump trailer of claim 18 wherein the accelerometer is attached to the web of the tub.

* * * * *